(12) United States Patent
Greenwald et al.

(10) Patent No.: US 6,460,735 B1
(45) Date of Patent: Oct. 8, 2002

(54) BEVERAGE DISPENSER HAVING SELECTABLE TEMPERATURE

(76) Inventors: Shlomo Greenwald, 113 Randolph Rd., Ithaca, NY (US) 14850; Zipora Greenwald, 113 Randolph Rd., Ithaca, NY (US) 14850

( * ) Notice: Subject to any disclaimer, the term of this patent is extended or adjusted under 35 U.S.C. 154(b) by 0 days.

(21) Appl. No.: 09/930,324

(22) Filed: Aug. 15, 2001

Related U.S. Application Data

(63) Continuation-in-part of application No. 09/769,151, filed on Jan. 24, 2001.

(51) Int. Cl.$^7$ ................................................ B67D 5/62
(52) U.S. Cl. ........................ 222/146.1; 222/146.2; 222/146.6; 222/145.5; 99/280; 236/12.1; 236/12.11
(58) Field of Search ..................... 222/146.1, 144.5, 222/145.5, 146.2, 146.5, 146.6; 99/54, 279, 280, 281, 282, 290; 62/398; 236/12.1, 12.11; 426/433

(56) References Cited

U.S. PATENT DOCUMENTS

| | | | | |
|---|---|---|---|---|
| 3,634,107 A | * | 1/1972 | Cornelius | 99/275 |
| 4,470,999 A | * | 9/1984 | Carpiac | 426/506 |
| 4,550,651 A | * | 11/1985 | Haynes | 99/279 |
| 4,649,809 A | * | 3/1987 | Kanezashi | 99/290 |
| 4,757,752 A | * | 7/1988 | Robins et al. | 99/279 |
| 4,791,860 A | | 12/1988 | Veerheijan | |
| 4,792,059 A | * | 12/1988 | Kerner et al. | 222/67 |
| 4,920,871 A | * | 5/1990 | Anson et al. | 99/295 |
| 5,014,611 A | * | 5/1991 | Illy et al. | 99/280 |
| 5,042,689 A | * | 8/1991 | Mrugala et al. | 222/66 |
| 5,584,229 A | * | 12/1996 | Anson | 99/280 |
| 5,724,883 A | * | 3/1998 | Usherovich | 99/290 |
| 5,858,437 A | * | 1/1999 | Anson | 426/431 |
| 5,975,365 A | * | 11/1999 | Hsieh | 222/129.4 |
| 5,992,685 A | * | 11/1999 | Credle, Jr. | 222/1 |
| 6,240,829 B1 | * | 6/2001 | McGarrah | 99/275 |

OTHER PUBLICATIONS

Coffee Brewing "Tutorial", wysiwyg://4/http://coffeetea.about . . . ibrary/guide/blgc_1etemperature.htm; 1 page.

* cited by examiner

Primary Examiner—Lesley D. Morris
Assistant Examiner—Frederick C Nicolas
(74) Attorney, Agent, or Firm—Brown & Michaels, PC

(57) ABSTRACT

The present invention dispenses hot coffee or other beverage by the cup at a selected temperature, which can be varied from cup-to-cup. The beverage is brewed in a conventional way, and in one embodiment is stored in a conventional holding tank at elevated temperature. The holding tank communicates with two smaller reservoirs. A quantity of beverage is stored in a first reservoir at an elevated temperature, at or above the maximum desired dispensing temperature. A second quantity of beverage is cooled and stored in a second reservoir at a lower temperature, at or below the minimum desired dispensing temperature. When a cup of beverage is to be dispensed, the temperature is selected, and a quantity of beverage is dispensed from each of the reservoirs, proportioned so that the resulting dispensed beverage is at the selected temperature. In another embodiment, the first reservoir is omitted, and beverage from the holding tank provides the elevated temperature beverage for mixing. In several other embodiments, no cooling mechanism is needed. Instead, the holding tank is at a cooler temperature than the lowest vend temperature, and the beverage must be heated to the hot reservoir temperature and, in one embodiment, the cold reservoir temperature. In another embodiment, the holding tank functions as a cold reservoir. In still another embodiment requiring no heaters, the holding tank is eliminated, and the beverage is held in insulated chambers at the higher and lower temperatures.

45 Claims, 10 Drawing Sheets

BEVERAGE DISPENSER HAVING SELECTABLE TEMPERATURE

REFERENCE TO RELATED APPLICATION

This is a continuation-in-part of parent patent application Ser. No. 09/769,151, filed Jan. 24, 2001. The aforementioned application is hereby incorporated herein by reference.

BACKGROUND OF THE INVENTION

1. Field of the Invention

The invention pertains to the field of fluid dispensers. More particularly, the invention pertains to beverage dispensing machines having temperature regulation of the dispensed product.

2. Description of Related Art

In most aspects of our life, each individual person has his or her own preferences. For example, people prefer different kind of food, different kind of spices in food and so on. This is also true when it comes to coffee—each person likes to drink his coffee at a different temperature. Especially in fast food restaurants and coffee shops, the temperature of the coffee that is sold is most often very hot, much too hot for most people to drink. So each person has to wait until his coffee will cool to his or her desired temperature, which might take 10 to 20 minutes. This become very irritating, especially when you want to drink your coffee right away and the only way to do it is by small sips, and even then you will burn your tongue. Since we have the free choice to buy our food according to our preference, why not the temperature of our coffee?

Industrial coffee machines typically have two main parts: a brewer and a container where the coffee is stored. Normally, for best results coffee is brewed at a temperature of near or just below boiling—about 200°–210° F. Then, the coffee is stored at a reduced temperature, so as not to cause the flavor to deteriorate too badly. The coffee temperature in the storing container is maintained at about 180° F. or more by a regulated or continuous heater or an outside heat plate.

Thus, the temperature of the coffee that is served is about 180° F., which is too hot to drink—for most people a drinkable coffee temperature is between 130° to 150° F. In fast food restaurants the coffee is served in paper cups, the paper material of the cup is a good heat insulator and has very small heat capacity. Therefore it takes quite a long time until the coffee cools down to the desired drinkable temperature for each individual. Since the customer does not know what is the coffee temperature he will probe the coffee temperature by taking small sips.

By doing so he might burn his tongue and the inside of his mouth. Also many customers would like to drink their coffee right away with their food and not have to wait until the coffee will cool to the desired temperature. One study showed that while coffee shops tend to serve coffee between 168° F. and 187° F., but a survey of 225 consumers showed the largest group preferred their coffee at 140° F. or 160° F. (O'Mahoney, et al, "At What Temperature Should You Serve Coffee?", 1999 Annual Meeting of the Institute of Food Technologies, Report 50B-1).

There have been a number of U.S. patents covering devices for dispensing beverages, especially coffee or tea, at different temperatures.

Cornelius, U.S. Pat. No. 3,634,107, "Apparatus for Dispensing Coffee Beverage" (1972) is a vending machine which stores carbonate coffee concentrate at ambient temperature (or refrigerated non-carbonated concentrate). On a vending request, it mixes a selected volume of the coffee concentrate with cold and hot water to dispense coffee at a selected temperature and concentration. Unlike the present invention, Cornelius' vending machine does not dispense fresh coffee, and requires maintenance of volumes of water and coffee concentrate at various temperatures.

In Haynes, U.S. Pat. No. 4,550,651, "Batch-brewing Coffee System" (1985), coffee is brewed in batches, and stored at reduced temperature in a holding tank. When a cup is desired, the brewed coffee is heated by passage through a heat exchanger in a heating tank. The Haynes device cannot set a specific temperature for each cup of coffee.

In Verheijen, U.S. Pat. No. 4,791,860, "Equipment for Supplying Hot Water" (1988), the user sets temperature of water desired for beverage. The temperature is controlled by passing water through flow-through heater for specific time, then turning off heater or bypassing heater, so cold water is dispensed for specific time, mixing to produce water of selected temperature. Verheijn does not provide brewed coffee, but rather water of a selected temperature, and requires complicated flow-through heaters, mixing valves, and timing circuitry.

Kerner et al, U.S. Pat. No. 4,792,059, "Selected Hot, Cold and Room Temperature Pure Water Dispenser" (1988) is a water dispenser which contains hot and cold reservoirs fed from holding tank. Three valves control water dispensed, so the user has a choice of hot, cold or water at something between room temperature and tap temperature, but cannot select a specific temperature of the water. Kerner does not brew coffee or other beverages, but is simply an office water cooler/heater which can dispense water at three temperatures.

Anson, et al, and Anson patents, assigned to the well-known industrial and office coffee-maker manufacturer Bunn-o-Matic, (U.S. Pat. Nos. 4,920,871, 5,584,229, and 5,858,437) all provide coffee brewers which can brew a beverage at the normal 200° F. temperature, but dispense it into a carafe at a reduced temperature, where it is presumably kept at the lower temperature for pouring into customers' cups. Anson's machines use a two-part brewing funnel which has a bypass channel for colder water. The hot brewing water goes through the coffee grounds or tea leaves in the center of the basket or funnel, and mix with the colder water in the bypass channel. Anson cannot vary the temperature of each cup of coffee (the customer's coffee is poured at whatever temperature the carafe is kept at), and the cooler the desired temperature, the more dilute the beverage as more cold water is mixed with the brew output.

Usherovich, U.S. Pat. No. 5,724,883, "Hot/Cold Beverage Brewing Device" (1998) is a home-type coffee or tea maker which, in addition to the conventional coffee brewing mechanism, has a second carafe which can store the brewed beverage at a lower temperature by passing the hot beverage through an exchanger with a cooling medium, and then diluting the hot concentrate with cold water. There is no option for dispensing a cup of brewed beverage at a specific temperature, and, as a dilution system, the lower the temperature to be dispensed, the weaker the beverage.

SUMMARY OF THE INVENTION

The present invention dispenses hot coffee or other beverage by the cup at a selected temperature, which can be varied from cup-to-cup. The beverage is brewed in a conventional way, and in one embodiment is stored in a conventional holding tank at elevated temperature. The holding tank communicates with two smaller reservoirs. A quantity of beverage is stored in a first reservoir at an elevated temperature, at or above the maximum desired dispensing temperature. A second quantity of beverage is cooled and stored in a second reservoir at a lower temperature, at or below the minimum desired dispensing temperature. When a cup of beverage is to be dispensed, the temperature is selected, and a quantity of beverage is dispensed from each of the reservoirs, proportioned so that the resulting dispensed beverage is at the selected temperature. In another embodiment, the first reservoir is omitted, and beverage from the holding tank provides the elevated temperature beverage for mixing.

In the present invention the original but colder coffee is mixed with the original but hotter coffee to adjust the coffee temperature to the desired one. Because of this we preserve the coffee quality by not changing the strength or the taste of the coffee, only its temperature. This is superior to those systems which use cold water, diluting the coffee strength and changing its taste.

In the present invention the cold and the hot reservoirs are refilled automatically from the main holding tank. Therefore the system requires only one single mixing valve to control the coffee temperature, making the present system simpler and more reliable. The simple system of the invention also allows much more accurate control of temperature than the reheat or dilution systems.

The system of the invention can serve single users where each patron can choose and receive coffee at different temperature. In addition he will receive the coffee at the chosen temperature independent of the quantity he is pouring out.

In one embodiment, the system of the invention can be directly added to existing commercial coffee makers without making any changes to the coffee makers, improving the quality and the taste of the coffee because:

the coffee can be brewed at the optimal temperature to get the best coffee—about 200° F. Today, most coffee makers have a brewing temperature around 180° F. because of safety concerns.

in the two-reservoir plus holding tank embodiment of the invention, the coffee in the holding tank can be stored at lower temperature which will extend the time that the coffee can stand without loosing its quality. This is possible because in our system the coffee temperature that is poured out is independent on the coffee temperature in the holding tank.

Adding the system of the invention to existing coffee makers will eliminate the need of a heater or external hot plate used to keep the coffee in the holding tank at high temperature (180° F.). Instead only the small amount (5 to10%) in the hot reservoir of the system has to be that hot. This will lower the cost of operating the coffee maker.

DETAILED DESCRIPTION OF THE INVENTION

Figure 1:
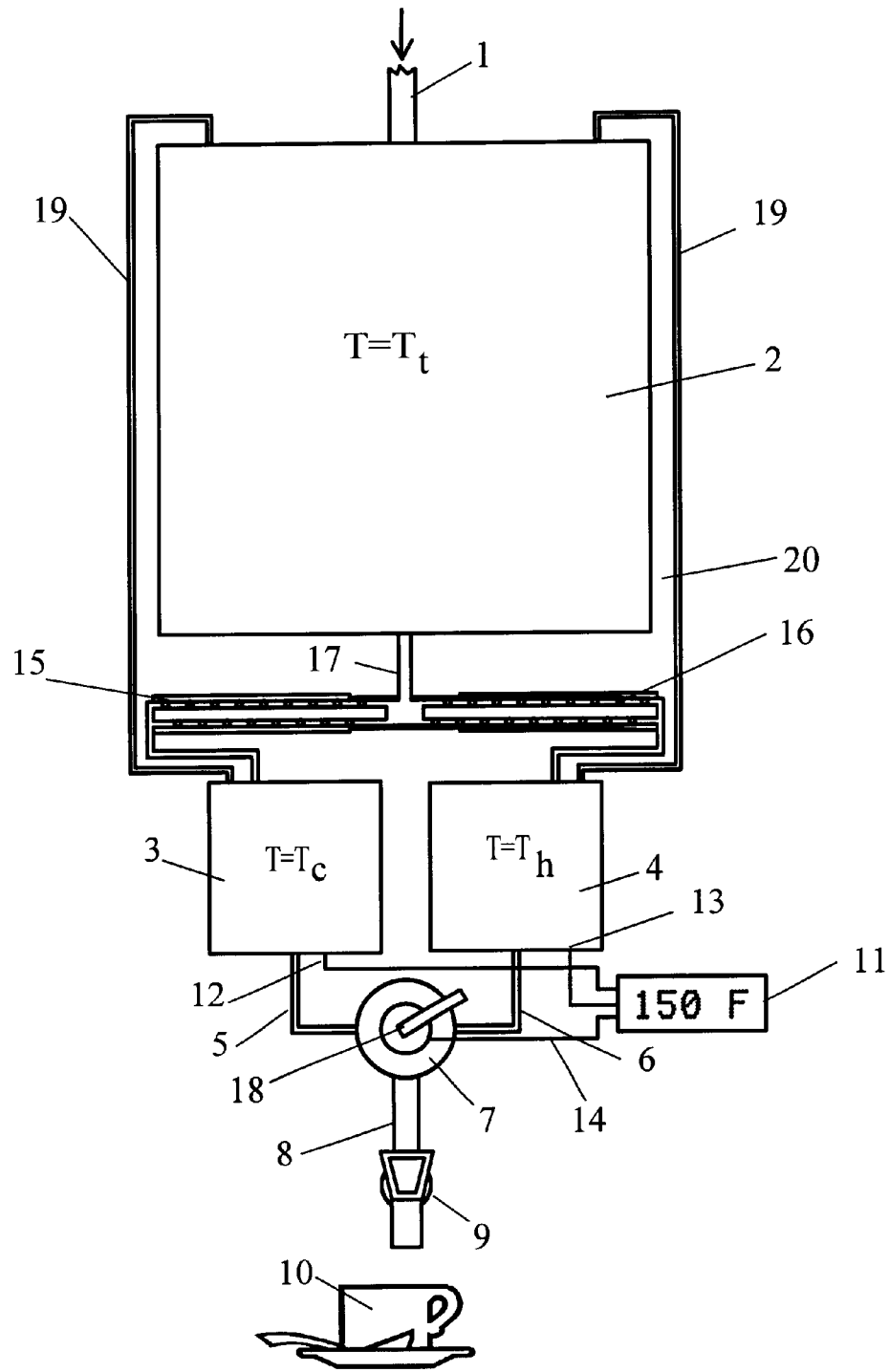
FIG. 1 shows a schematic representation of a first embodiment of the invention, having a holding tank and hot and cold reservoirs.

A schematic drawing of the coffee maker of the invention can be seen in FIG. 1. The coffee is brewed in a conventional manner, and the brewing mechanism is not shown. The brewed coffee enters a holding tank (2) through pipe (1) at whatever the brewing temperature is—typically between 195° F. and 205° F. The holding tank (2) is a conventional feature of industrial coffee brewers, and is typically around 10 gallons in size for a typical fast-food restaurant. The size of the holding tank is not important to the teachings of the invention.

The coffee temperature in the holding tank (2) is regulated at a temperature which is referred to as "$T_t$", which is lower than the temperature of the coffee after brewing (usually about 180° F.). The exact value of $T_t$ will be determined by the requirements of the particular application—a lower temperature will last longer, but if the temperature is too low it might require significant reheating for service.

In addition to the holding tank (2), this embodiment of the invention has two smaller reservoirs, referred to herein as the "cold" reservoir (3), kept at a temperature of $T_c$, and the "hot" reservoir (4), kept at a temperature of $T_h$. These reservoirs are smaller than the holding tank—in an embodiment where the holding tank is five to ten gallons, the reservoirs would preferably be about one-half to one gallon each. Smaller dispensing machines would use smaller reservoirs, but the reservoirs will need to contain at least a few cups of beverage each, as will be seen in the discussion below.

The "hot" temperature, $T_h$, will need to be greater than or equal to the highest temperature at which it would be desired to dispense the beverage—for most coffee dispenses a temperature of about 180° F. would be preferred, although some restaurants might want to have this even higher—as much as 195° F. According to one report (O'Mahoney, et. al, "At What Temperature Should You Serve Coffee?", 1999 Annual Meeting of the Institute of Food Technologists, Report 50B-1) coffee shops serve coffee between 168° F. and 187° F., and it is reported that McDonalds dispenses coffee at closer to 190° F.

The "cold" temperature $T_c$, will need to be less than or equal to the lowest temperature at which it would be desired to dispense the beverage—about 120° F. is preferred, although this temperature could be set higher or lower as desired.

In a preferred embodiment, the coffee temperature in the holding tank (2) will be lower than the coffee temperature in the hot reservoir (4), but higher than the temperature in the cold reservoir (3) (i.e. $T_h > T_t > T_c$). As a result, the coffee from the holding tank (2) will need to pass from the exit pipe (17) through a heater (16) before it enters the hot reservoir (4), so its temperature will be close to the desired hot reservoir temperature $T_h$. On the other hand, the coffee from the holding tank (2) to the cold reservoir (3) will be cooled by a cooler (15) to reduced to (or below) the cold reservoir temperature $T_c$. With the use of the heater (16) and cooler (15), the reservoir temperatures will not be significantly change from the desired $T_h$ and $T_c$ as the supply of coffee in the reservoirs is drawn off and new coffee is drawn in from the holding tank (2).

Vent lines (19) lead from the hot (4) and cold (3) reservoirs back to the top of the holding tank (2) to avoid problems due to backpressure as coffee fills the reservoirs from the holding tank.

Output pipe (5) from the cold reservoir (3) and output pipe (6) from the hot reservoir (4) feed a mixing valve (7). In a sampler embodiment, the desired coffee temperature is selected by rotating the selector handle (18) on a mixing valve (7), which mixes the coffee coming from the cold reservoir (3) with the coffee coming from the hot reservoir (4). The mixed coffee is dispensed into the cup (10) from the mixing valve output (8) through a dispensing valve (9). The selected coffee dispensing temperature can thus vary continuously from $T_c$ (the temperature of the cold reservoir), if the mixing valve is set to draw only from pipe (5), to $T_h$, (the temperature of the hot reservoir) if the mixing valve is set to draw only from pipe (6). At any intermediate setting, the dispensing temperature will depend on the mixture.

Figure 2:
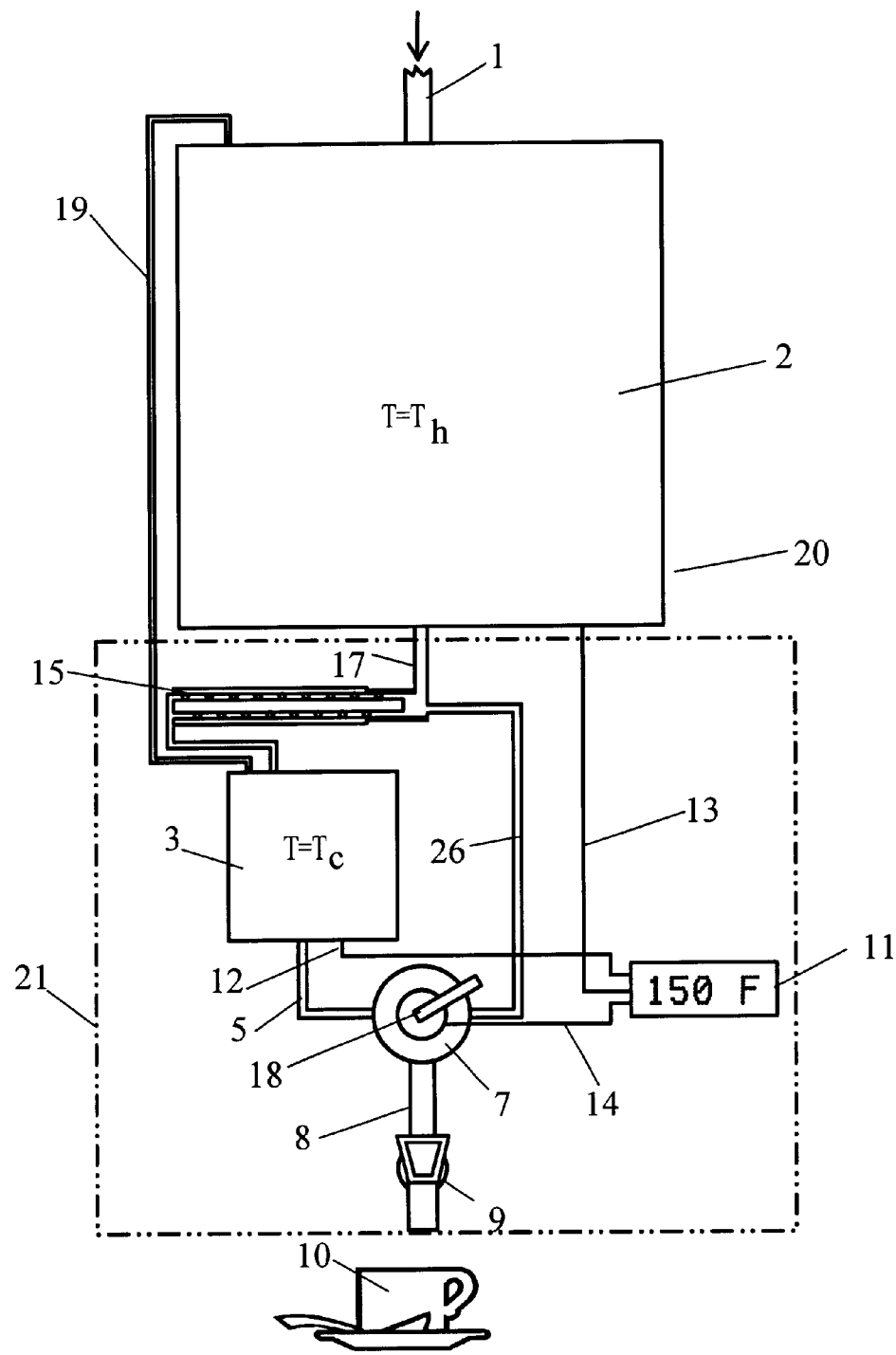
FIG. 2 shows a schematic representation of a second embodiment of the invention, having a holding tank and a cold reservoir.

FIG. 2 shows an alternative embodiment of the invention, in which the hot reservoir is replaced by a direct feed line (26) from the holding tank (2). This embodiment can be built as a simpler version of the embodiment of FIG. 1, above, or installed as an add-on modular (21) to an existing industrial coffee or other hot beverage maker, in which case the holding tank (2) will be the conventional holding tank in the coffee maker, and pipe (17) would be connected to the normal output of the coffee maker.

When built as an add-on module (21), the coffee temperature in the holding container of such coffee makers is sufficiently high ($T_h \sim 180$ F), that a separate hot reservoir is not needed. If built as a simpler add-on unit than the two-reservoir system of FIG. 1, the holding tank temperature would be set at a temperature which is at or above the hottest temperature at which it is desired to dispense the beverage ($T_t = T_h$). Instead, a line (26) from the output (17) of the holding tank (2) is connected directly to the hot inlet of the mixing valve (7). As in the first embodiment described above, the cold reservoir (3) is connected to the holding tank (2) output (17) via a cooling system (15) that cools down the incoming coffee from $T_h$ to a temperature near $T_c$.

The rest of the system of this embodiment is the same as described above for the embodiment of FIG. 1.

Figure 3:
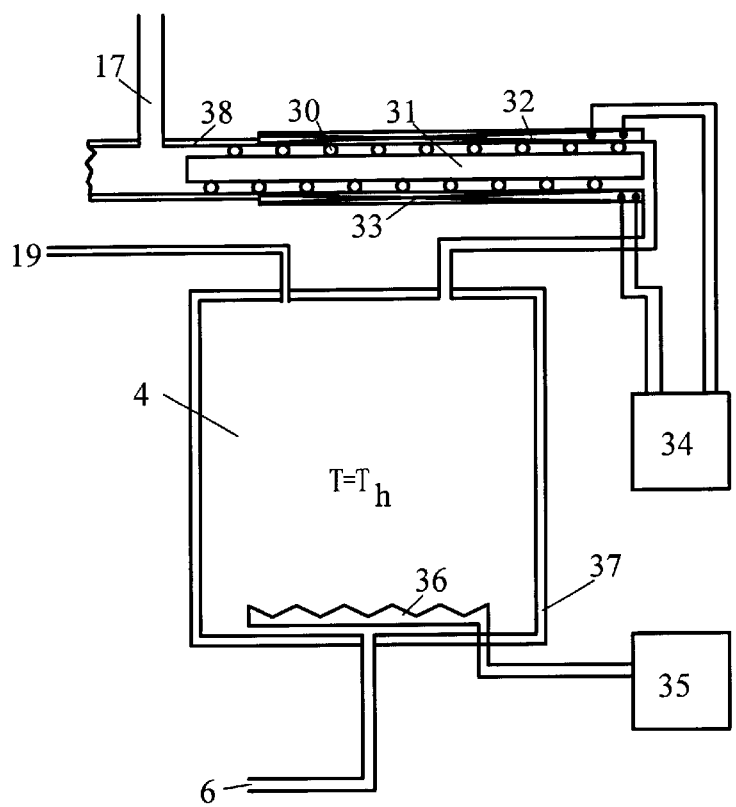
FIG. 3 shows a schematic detail of a hot reservoir for use with the invention.

FIG. 3 shows a detail of the hot reservoir of the invention, as is used in the embodiment of FIG. 1. The volume of the hot reservoir (4) is small relative to the holding tank (2), preferably about one-half gallon or smaller, and it is preferably built with good heat insulation in its walls (37). In a preferred embodiment, the reservoir (4) is built with its walls in two layers, with air or vacuum between the walls, similar to a vacuum flask construction. Alternatively, foam or other insulation can be provided in the walls.

The temperature of the coffee in the reservoir (4) is continuously regulated to $T_h$, preferably within about ±1° F. using an inside heater (36), powered and controlled by conventional temperature regulating circuitry (35). The incoming coffee from output (17) of the holding tank will be heated by a heat exchange to closely match the coffee temperature $T_h$ in the hot reservoir.

A preferred embodiment of a heat exchanger useful with the invention is built from an inner (31) and an outer (38) concentric tube, where the inner tube (31) is used as a filler and the coffee flows in between the two tubes. A wire (30) whose diameter is equal to the spacing between the two tubes (31) and (38) is wound in a helix type winding around the inner tube (31). This will force the coffee to flow in a thin layer very close to the outer tube (38), which is hot, in a helical long path. It will also convert the flow from laminar to a turbulent, which will increase the efficiency of the heating. The helical path can be made ten times longer than the straight path. The heat exchanger is preferably thermally insulated.

In order to be able to heat the incoming coffee very fast the heat exchanger will preferably have two heaters. A first heater (33) is low power which will operate continuously to keep the heat exchanger at high temperature approximately equal to $T_h$. The second heater (32) will operate in pulse mode, and will provide the power that is needed to heat the incoming coffee. It may be turned on by the opening of the output valve and turned off by the closing of the output valve, or by sensing coffee flow in the exchanger, or thermally, or in any other way which might be desired. The heaters are powered and controlled by conventional control circuitry (34).

Figure 4:
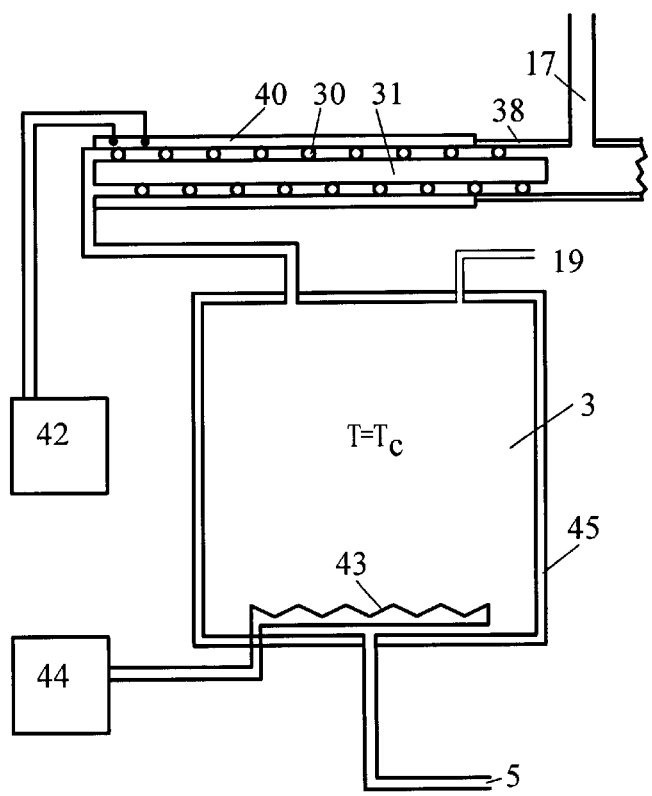
FIG. 4 shows a schematic detail of a cold reservoir for use with the invention.

FIG. 4 shows a detail of the cold reservoir (3) of the invention. As in the hot reservoir described above, the volume of the cold reservoir (3) is also preferably about one-half gallon or smaller, and it, too, is built with insulation (45) in the walls. Again, two layers walls with air or vacuum between the walls, as in a vacuum flask, will provide good heat insulation, or other insulating materials such as foam can be used.

The temperature of the coffee in the cold reservoir is continuously regulated to $T_c$, preferably within a range of ±1° F., using an inside heater (43) powered and controlled by conventional circuitry (44).

The incoming coffee from the output (17) of the holding tank is cooled down to a temperature approximately equal to, or slightly less than $T_c$ by a heat exchanger. FIG. 4 shows this heat exchanger structures much the same as the heat exchanger for the hot reservoir shown in FIG. 3; an inner (31) and outer (38) concentric tube, where the inner tube (31) is used as a filler and the coffee flows in between the two tubes. A wire (30) whose diameter is equal to the spacing between the two tubes (31) and (38) is wound in a helix type winding around the inner tube (31). This will force the coffee to flow in a thin layer very close to the outer tube (38), which is cooled by cooler (40), in a helical long path. It will also convert the flow from laminar to a turbulent, which will increase the efficiency of the cooling. The helical path can be made ten times longer then the straight path. The heat exchanger is preferably thermally insulated.

The cooler (40) used in this heat exchanger may work in any one of the ways known to the art, under the control of appropriate circuitry and supply (42). For example, tap water can be circulated around the exchanger, in which case (42) would comprise a pump or valve and circuitry to start and stop the pump or open and close the valve in a conventional manner in response to operation of the output valve, or by sensing coffee flow in the exchanger, or thermally, or in any other way which might be desired. Alternatively, the heat exchanger can be cooled by a forced air cooling system, in which a fan is used to increase the airflow across radiating fins. In such a case, (42) would be a power supply for the fan, in a conventional manner in response to operation of the output valve, or by sensing coffee flow in the exchanger, or thermally, or in any other way which might be desired. Other cooling methods, such as solid-state Peltier elements, controlled by appropriate circuitry, are possible within the teachings of the invention.

In its simplest form, the beverage dispensing system of the invention could use a simple mixing valve (7), with a calibrated scale showing the approximate temperature provided by the position of the handle (18). The position of the mixing valve determines the mixing ratio between the cold and the hot coffee. If desired, a thermometer, preferably digital, could read out the temperature of the beverage as it's dispensed, allowing for finer adjustment during dispensing.

Figure 5:
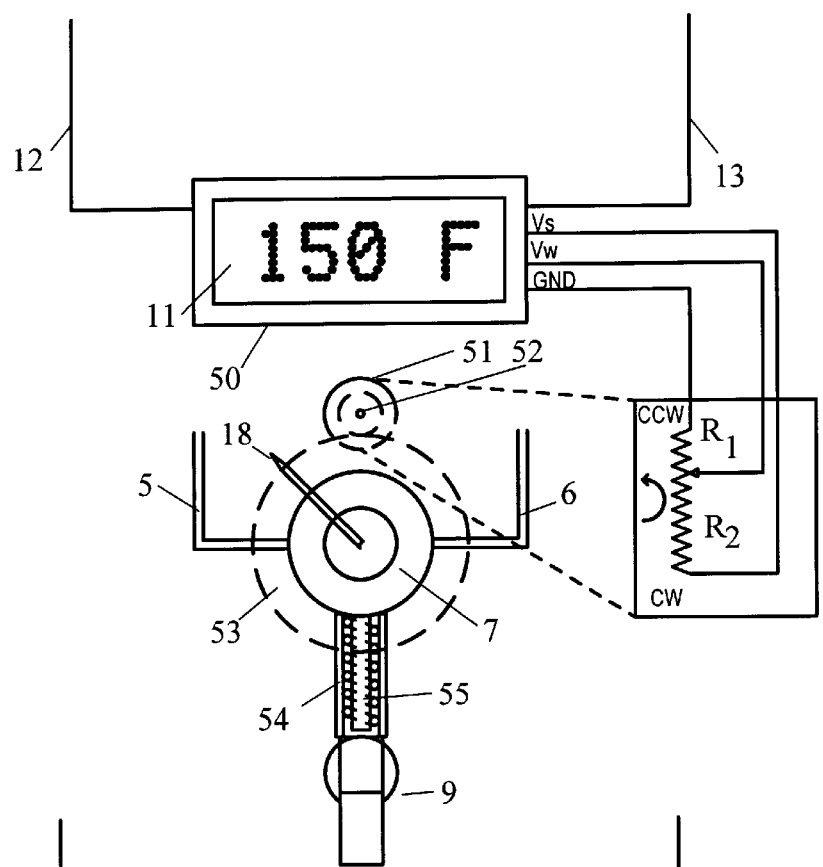
FIG. 5 shows a schematic representation of a manual temperature selection mechanism for use with the invention.
Figure 6:
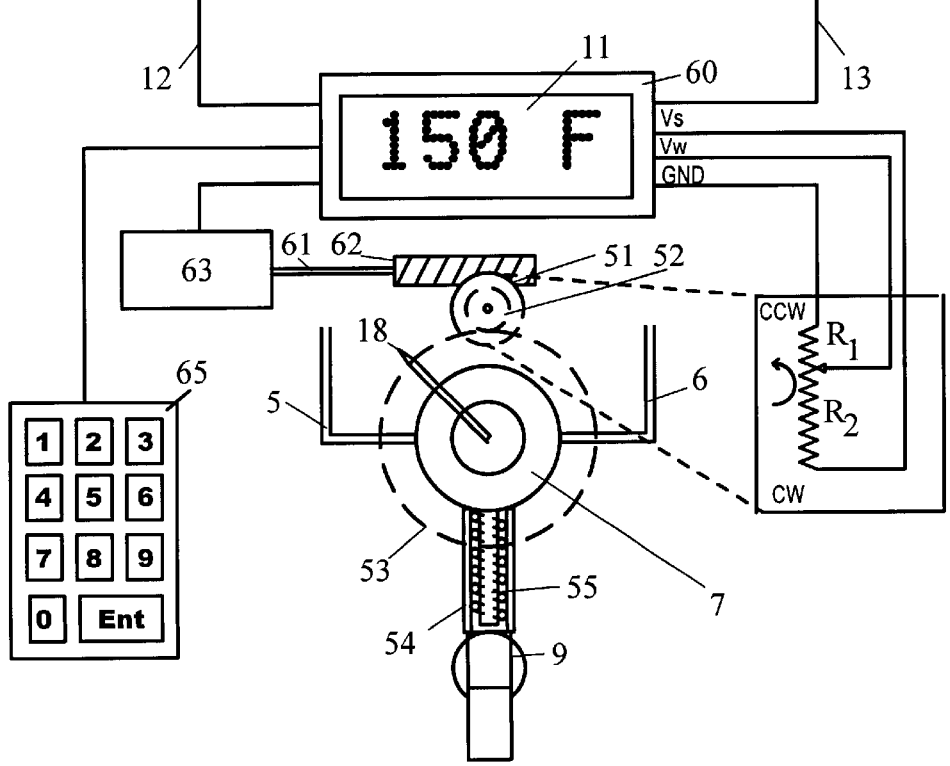
FIG. 6 shows a schematic representation of an automatic temperature selection mechanism for use with the invention.

It is preferred, however, to be able to dispense coffee or other hot beverages with the temperature regulated to a finer degree than would be possible with such a relatively crude setup. FIGS. 5 and 6 show details of two temperature control systems which may be used within the teachings of the invention, which provide for manual and automatic adjustment of the temperature of the dispensed beverage, respectively.

In both figures, mixing valve (7) has a manual operating handle (18), which can select the proportion of cold and hot beverage dispensed from inlet pipes (5) and (6), respectively. The beverage output of the mixing valve (7) is preferably mixed in a mixing tube (54), which is preferably covered in thermal insulation (55), so as to maintain the selected temperature of the beverage as long as possible, and the flow is controlled by the dispensing valve (9). The output mixing tube is constructed in a similar way as the heat exchanger that was described in FIGS. 3 and 4. It is constructed in this way to ensure a) fast mixing between the hot and cold coffee b) to minimize the amount of the trapped coffee between the two valves.

Feedback of the position of the valve (7) is provided by ganging the valve (7) to a potentiometer (51) through gearing (53) and (52). For maximum accuracy, the potentiometer is preferably of the precision multi-turn type, and the gearing is chosen to rotate the potentiometer a number of times for a full revolution of the valve (7) handle (18)—a 5:1 or 10:1 ratio would be preferable, depending on the number of turns available on the potentiometer (five turn or ten turn). The potentiometer can be viewed as a voltage divider comprising two resistors $R_1$ and $R_2$ in series, in which the voltage present at the center of the divider (wiper) will be proportional to the position of the valve. The temperature of the cold reservoir is sensed by a sensor (12), and similarly the temperature of the hot beverage source (hot reservoir, as in FIG. 1, or holding tank as in FIG. 2) is sensed by sensor (13). A digital readout (11) preferably provides a display of the temperature, based on sensors (12) and (13) and valve position (14).

In the manual system of FIG. 5, the coffee temperature is selected by rotating the handle (18) on mixing valve (7). In order to ensure that the accuracy of the selected coffee temperature will not be effected by the fluctuation of the coffee temperature in the cold and hot reservoirs (or in the holding tank, in the embodiment of FIG. 2), the temperatures of the coffee in both reservoirs are continuously measured by sensors (12) and (13), and the measured temperatures at the time when the selection is made together with the mixing valve position is used to calculate the poured coffee temperature.

The poured coffee temperature $T_p$ is given by:

$$T_P = \left(\frac{R_t - R_1}{R_t}\right)T_c + \left(\frac{R_t - R_2}{R_t}\right)T_h$$

where $R_1$ and $R_2$, as explained above, are the resistances of the two portions of the potentiometer on either side of the wiper, and $R_t=R_1+R_2$. Thus it can be seen that if $R_t=0$ when the mixing valve is turned all the way to the left (counterclockwise), and the hot coffee inlet is closed, then the output coffee temperature will be equal to the cold reservoir temperature $T_c$. On the other hand, if when $R_2=0$ the mixing valve is turned all the way to the right and the cold coffee inlet is closed, the output coffee temperature will be equal to the hot reservoir coffee temperature.

It will be understood by one skilled in the art that in a practical circuit the values of $R_1$ and $R_2$ may be measured directly and the formula above used, or preferably, by using the potentiometer as a voltage divider—applying a voltage across the potentiometer and measuring the voltage at the wiper—the position of the wiper may be determined indirectly, and the temperature determined according to this formula:

$$T_P = \left(1 - \frac{V_w}{V_s}\right)T_c + \left(\frac{V_w}{V_s}\right)T_h$$

where $V_w$ is the voltage at the wiper (junction of $R_1$ and $R_2$), and $V_s$ is the source voltage applied across the potentiometer.

The display unit (50) for this embodiment of the invention, as shown in the schematic representation of FIG. 5, determines $T_c$ from sensor (12), and $T_h$ from sensor (13). As indicated in the figures, a source voltage $V_s$ is applied to the full clockwise (CW) end of potentiometer (51) (the free end of $R_2$), a ground reference is applied to the full counterclockwise (CCW) end of potentiometer (51)(the free end of $R_1$), and $V_w$ is read from the wiper (junction of $R_1$ and $R_2$). Using the formula above, when the user sets the handle (18) of the mixing valve (7) to a given position, the display unit calculates the temperature of the beverage which will be dispensed with the mixing valve (7) in its current position, and displays the temperature on the readout (11).

Figure 8:
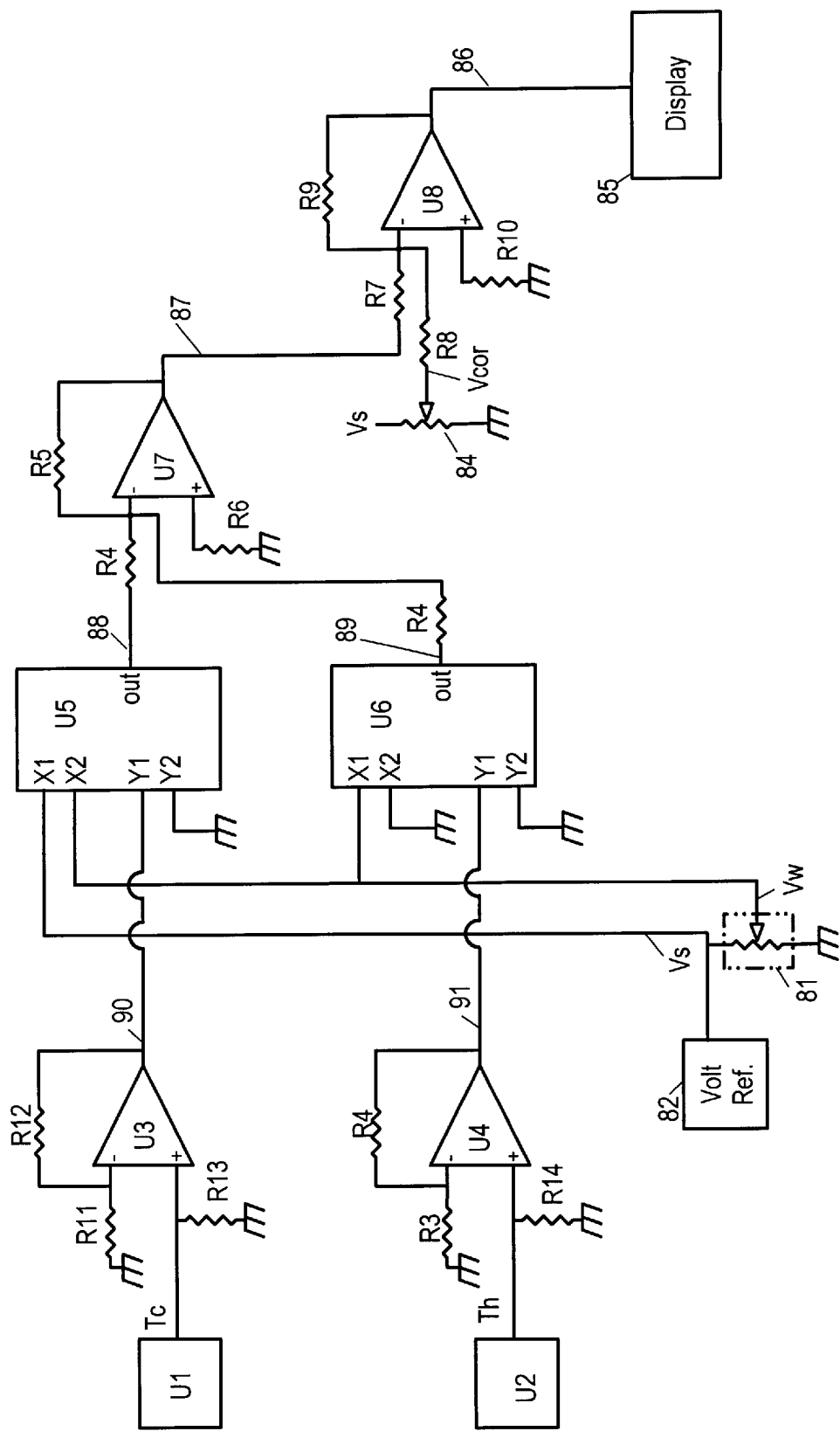
FIG. 8 shows a schematic of a circuit for use with the manual temperature selection mechanism of FIG. 5.

FIG. 8 shows a detailed schematic of a circuit which could be used to implement the manual embodiment of FIG. 5. It should be noted that the conventional power supply wiring and chip connections is omitted in the schematic for simplicity. It will be understood by one skilled in the art that the circuit will require an appropriate power supply, depending on the integrated circuits chosen, and each IC will need appropriate connections to the power supply.

The two temperature inputs, $T_c$ and $T_h$, are sensed by sensor ICs U1 and U2, respectively. These integrated circuits can be LM34 temperature sensors, manufactured by National Semiconductor. The LM34 accepts a voltage input of between +5 and +20 VDC, and outputs a voltage of +10.0 mV/° F.

The output $T_c$ of sensor U1 is fed into the "+" input of an amplifier U3, preferably a low-noise operational amplifier such as an NE5534 integrated circuit from Texas Instruments or Signetics (although any of the many op amps available with suitable characteristics could be used). The "−" input is connected to ground with resistor R11, and also to the output of the op amp through resistor R12. The "+" input is also connected to ground through resistor R13 (R13=R11∥R12). The output of the op amp, $V_c$ (90) is thus given by the formula, $$V_c = \left(\frac{R11 + R12}{R11}\right)T_c$$

The mixer valve position resistor (81) is a multi-turn potentiometer, as described in FIG. 5, above, coupled to the mixer valve. One end of the potentiometer is fed by a regulated voltage $V_s$ from a voltage reference (82), and the other end grounded. The voltage regulator is preferably any one of the many voltage regulator integrated circuits, such as an LM7810, available from many different manufacturers, or could be built with discrete components or a variable voltage regulator IC Such as the LM317. The wiper voltage from the potentiometer $V_w$ provides an indication of the position of the mixing valve.

$V_s$, $V_w$ and $V_c$ (90) are fed as the X1, X2 and Y1 inputs, respectively, into U5, an analog multiplier IC such as a MPY634 available from Burr-Brown. The Y2 input is grounded. The output (88) of the multiplier IC is given by the formula, $$\text{Output}(88) = V_c\left(\frac{V_s - V_w}{10}\right)$$

Similarly, the output $T_h$ of sensor U2 is fed into the "+" input of an amplifier U4, preferably a low-noise operational amplifier such as an NE5534 integrated circuit from Texas Instruments or Signetics (although any of the many op amps available with suitable characteristics could be used). The "−" input is connected to ground with resistor R3, and also to the output of the op amp through resistor R4. The "+" input is also connected to ground through resistor R14 (R14=R3∥R4). The output of the op amp $V_h$ (91) is thus given by the formula, $$V_h = \left(\frac{R3 + R4}{R3}\right)T_h$$

$V_w$ and $V_h$ (91) are fed as the X1 and Y1 inputs, respectively, into U6 an analog multiplier IC such as a MPY634 available from Burr-Brown. The X2 and Y2 inputs are grounded. The output (89) of the multiplier IC is given by the formula, $$\text{Output}(89) = \left(\frac{V_w V_h}{10}\right)$$

Output (88) of U5 and output (89) of U6 are fed, through resistors R4, into the "−" input of amplifier U7. As in U3 and U4, U7 can be any of the commonly available low noise operational amplifiers, such as the NE5534 integrated circuit from Texas Instruments or Signetics (although any of the many op amps available with suitable characteristics could be used). Feedback resistor T5 connects the "−" input to the output (87) of the op amp, and the "+" input is grounded by resistor R6 (R6=R4∥R4∥R5). Thus, the output (87) of U7 is given by the formula, $$\text{Output}(87) = -\frac{R_5}{R_4}\left[\left(\frac{10 - V_w}{10}\right)V_c + \frac{V_w V_h}{10}\right]$$

Output (87) is fed, through resistor R7, into the "−" input of operational amplifier U8, which also can be any of the commonly available low noise operational amplifiers, such as the NE5334 integrated circuit from Texas Instruments or Signetics (although any of the many op amps available with suitable characteristics could be used). Feedback resistor R9 connects the "−" input to the output (86) of U8. A correction voltage $V_{cor}$ is picked off a potentiometer (84), and fed to the "−" input of U8 through resistor R8. $V_{cor}$ allows for correction of the output voltage for coffee in the valve, as discussed below, or for other inaccuracies in the system. The "+" input of the op amp is grounded through resistor R10 (R10=R7∥R8∥R9). The output (86) of U8 is thus given by the formula, $$\text{Output}(86) = \text{Output}(87)\frac{R9}{R7} - V_{cor}\frac{R9}{R8}$$

Finally, the voltage at output (86) is read by digital display (85), which can be any one of many available digital voltmeters having an appropriate scale, such as 0–199 mV or the like.

In the automatic embodiment shown in FIG. 6, the customer or waitperson will type in the temperature of the coffee he would like to have on keyboard (65) and the control system (60) will rotate the mixing valve (7) to the right position using a motor (63) with a shaft (61) attached to a drive gear (62), which can couples to the smaller gear (51) on the potentiometer (51) or the larger gear (53) on the valve (7).

Once a temperature is entered on the keypad (65), the control system (60) will calculate the initial position of the mixing valve using the potentiometer (51) in the same way as was described in above. In addition, the control system, which will preferably work in a closed loop feedback mode, will calculate the temperature of the mixed coffee, using the inputs from sensors (12) and (13) and the valve position and the formulas above, and will adjust the position of the mixing valve (7) with the motor (63), until the mixing valve (7) is positioned such that the calculated mixed coffee temperature will match the selected temperature. The display (11) can be set to either display the selected temperature or the calculated temperature, or perhaps both, either simultaneously or alternately.

Figure 7:
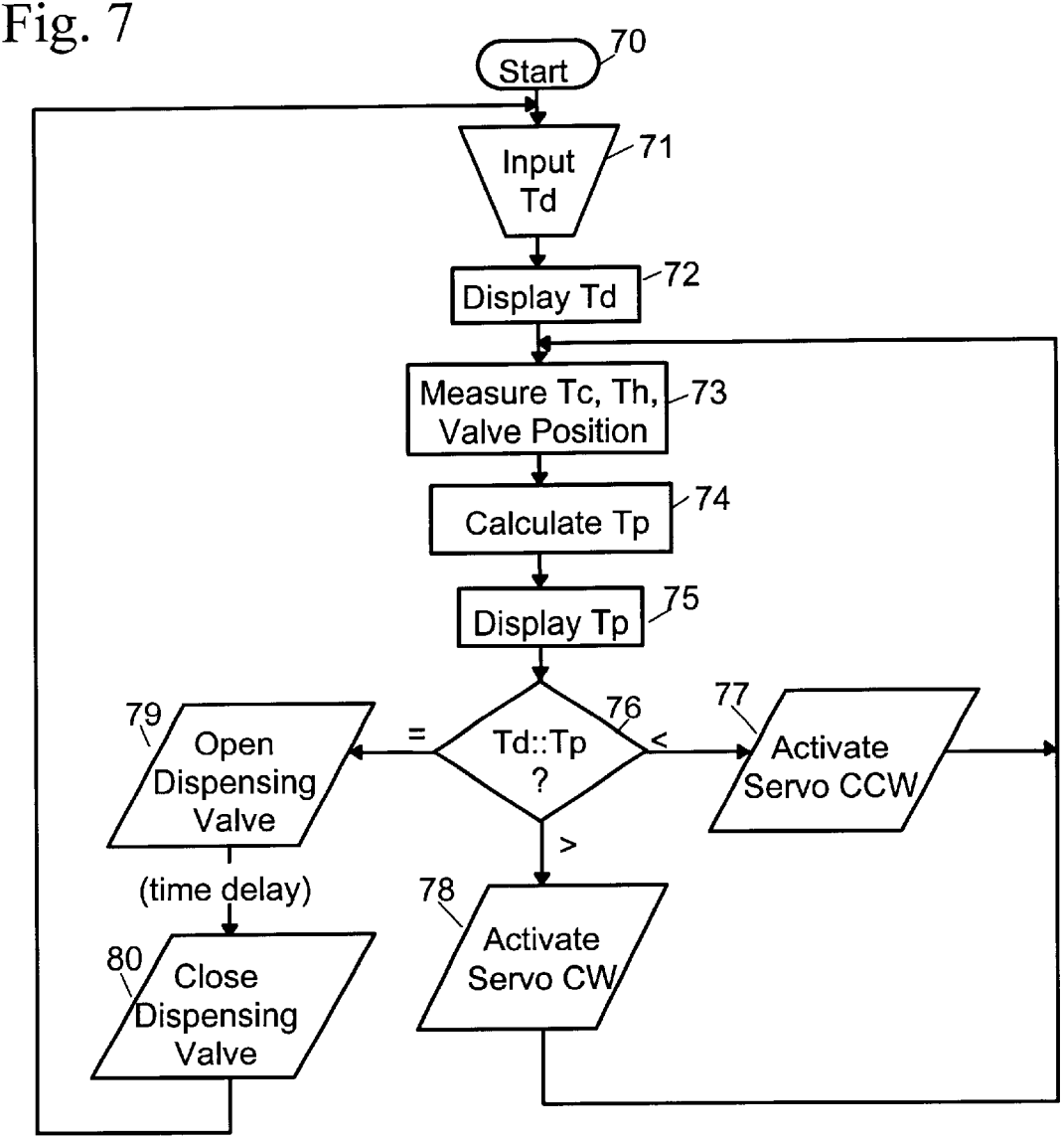
FIG. 7 shows a flowchart of a method of operation of the automatic temperature selection mechanism of FIG. 6.

FIG. 7 shows a flowchart of a possible method of operation of this automatic temperature selection mechanism. The method of the flowchart works as follows:

70. The method starts—variables are initialized, etc., in a conventional manner.
71. The user inputs the desired temperature ($T_d$) at the keyboard (65).
72. The system displays the entered temperature on the display (11) for confirmation. If desired, the system could require a confirming keystroke at this point.
73. The temperature ($T_c$) of the coffee in the cold reservoir (3), the temperature ($T_h$) of the coffee in the hot reservoir (4) and the mixing valve (7) position are measured.
74. The vend temperature ($T_p$) is calculated from $T_c$, $T_p$ and the current valve position, in accordance with the formula $$T_p = \left(1 - \frac{V_w}{V_s}\right)T_c + \left(\frac{V_w}{V_s}\right)T_h$$

where $V_w$ is the voltage at the wiper (junction of $R_1$ and $R_2$), and $V_s$ is the source voltage applied across the potentiometer.

75. The vend temperature $T_p$ calculated in step 74 is displayed on the display (11).
76. The desired temperature $T_d$ is compared to the vend temperature ($T_p$) at the current mixing valve setting.
77. If $T_d < T_p$, the servo motor (63) is activated, turning the mixing valve (7) counterclockwise.
78. If $T_d > T_p$, the servo motor (63) is activated, turning the mixing valve (7) clockwise.

The method then loops back from either step 77 or step 78 to measure the valve position and temperatures in step 73.

79. If $T_d = T_p$, then the desired temperature has been reached, and the dispensing valve (9) is opened. This can be done automatically, or, if desired, manually by the customer or waitstaff.
80. After a time delay to allow the cup to fill, the dispensing valve is closed, and the method loops back to await a new temperature entry at step 71.

In an even more automated application, in large places where coffee is served to patrons the control system (60) of multiple coffee machines of the invention can be connected to the order entry registers. Customers will order the kind of coffee and the temperature of the coffee they would like to have. This information with the order I.D. number of each register will be stored in system memory in the control unit (60). When a restaurant employee fills a customer order, he/she will either use the keyboard to type in the customer order number, or might even recite the order number via a microphone (not shown). Using that information the control system (60) of the invention will automatically adjust the mixing valve (7) as described above, so the served coffee will have the ordered temperature.

If desired, the system can include some compensation for the effects on the vend temperature of the small amount of coffee trapped in the mixing valve (7), or between the mixing valve (7) and the dispensing valve (9). With appropriate attention to minimizing the amount of trapped coffee, these effects can be minimized, but there will still be some effect, since this coffee will be at some other temperature than the selected vend temperature of the coffee coming from the mixing valve once the flow starts. If there has been a while between vends, the coffee, this trapped coffee will have had time to cool off. If there is only a short time between vends, the coffee will be at or near the last-selected vend temperature, which could be cooler or hotter than the current vent temperature.

The effects of trapped coffee can be compensated for by including an averaging factor for the known volume of the trapping volume. Alternatively, a temperature sensor at or near the vending valve (9) can measure the actual temperature of the coffee as it is dispensed, and compensate by slightly increasing or decreasing the vend temperature for part of the stream, or, as shown in the schematic in FIG. 8, a fixed compensation can be built into the circuitry.

The described in above are the preferred embodiment for the case when the coffee holding tank (2) is a part of a coffee maker. The coffee that is brewed at high temperature is stored in the holding tank (2) at high temperature and when the coffee runs out of the holding tank new coffee is brewed and stored in the holding tank. Using the beverage dispenser, as described in FIG. 1 or 2, each customer can select the temperature of his coffee as he or she desires.

Figure 9:
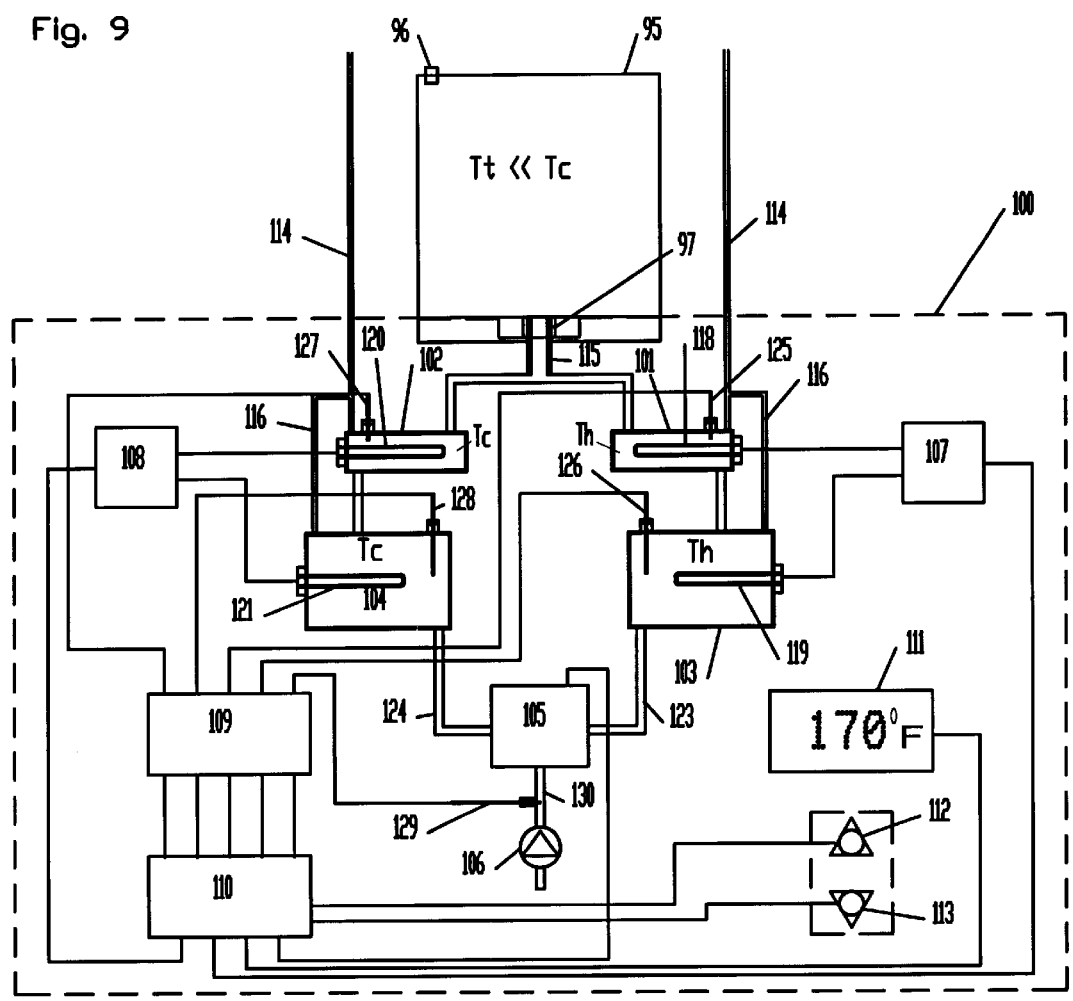
FIG. 9 shows a schematic of a third embodiment of the invention having a portable holding tank and both hot and cold reservoirs.
Figure 10:
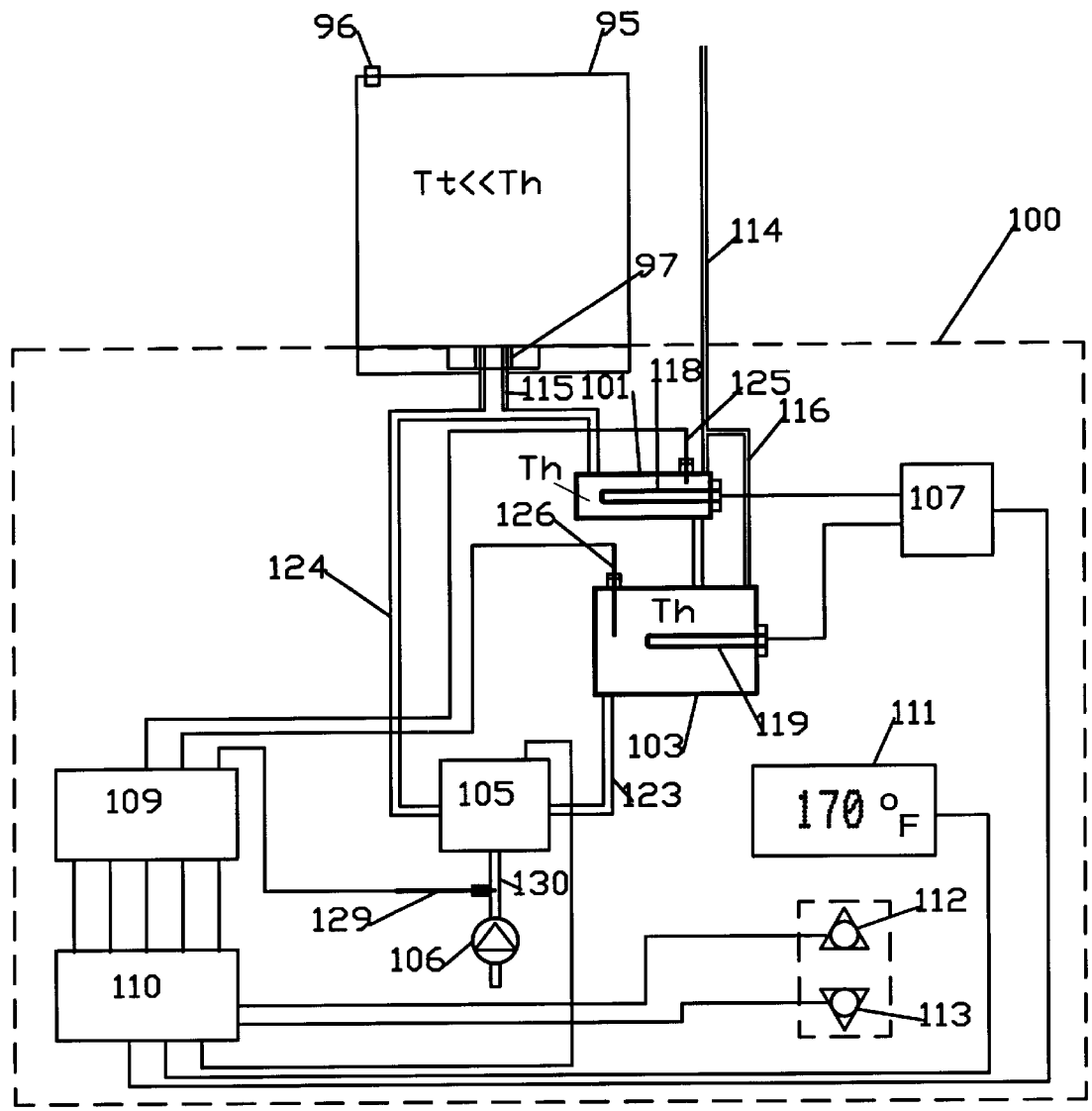
FIG. 10 shows a schematic of a fourth embodiment of the invention having a portable holding tank and a hot reservoir.
Figure 11:
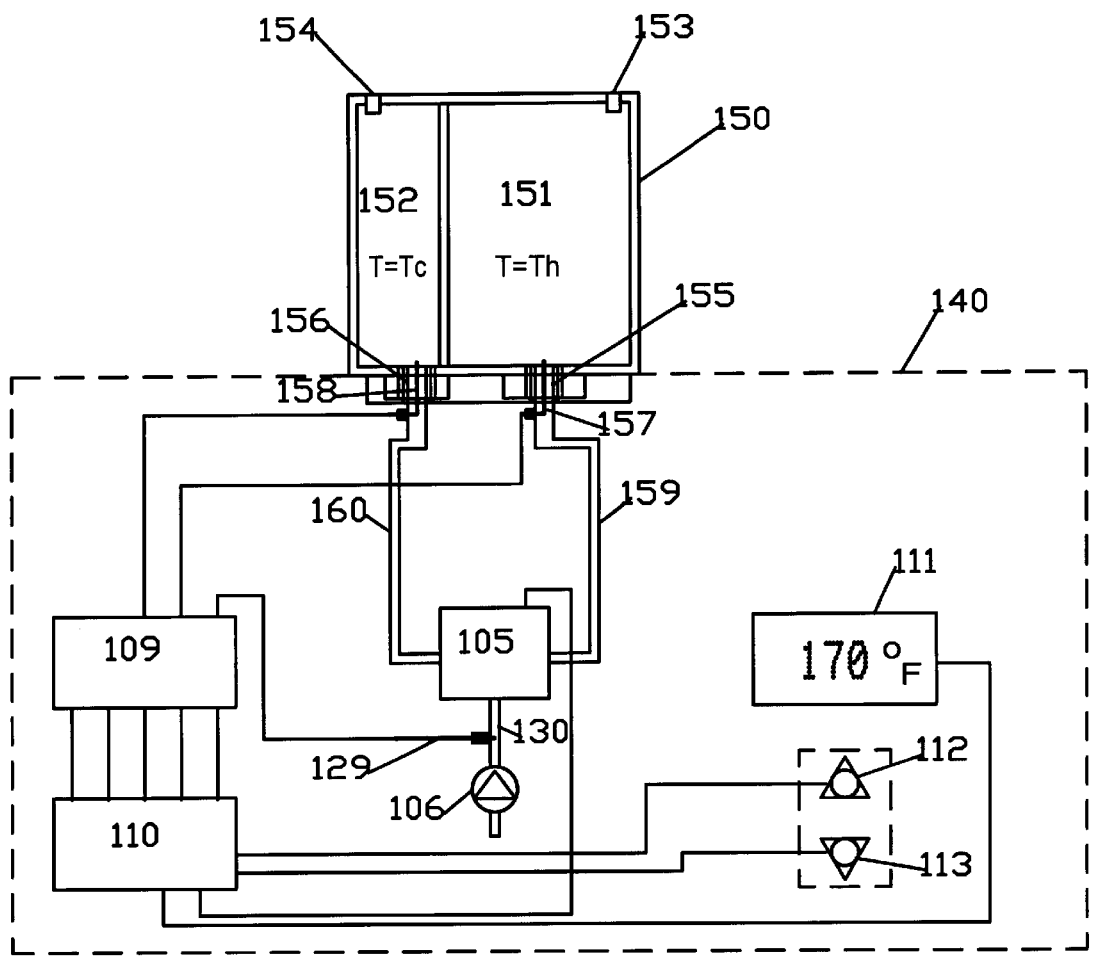
FIG. 11 shows a schematic of a fifth embodiment of the invention having a portable holding tank with a hot chamber and a cold chamber.

The following embodiments of the invention, which are described in FIGS. 9 to 11, are the preferred embodiments for the case when the coffee holding tank (95) is portable and is not attached to a coffee maker. The portable tank can be filled with fresh brewed coffee at a location that is far from the place where the coffee is served using the invention.

In this case the portable holding tanks can be filled with freshly brewed coffee at coffee brewing centers where the coffee can be brewed at the best conditions to achieve the highest coffee quality, preferred taste and any desired flavor. In order to preserve the coffee quality and taste the coffee will preferably be cooled down to low temperature while filling the portable tank by using heat exchangers. The portable tanks will be stored at low temperature. The portable tank will be delivered to the service location (restaurants, hotels, business offices, parties) where the portable tank (95) will be coupled to a beverage-dispensing-system as described in FIGS. 9 to 11. Using the dispensing system each customer can select the temperature of his/her coffee as he/she wishes.

Brewing the coffee at brewing centers and delivering the coffee in portable tanks to the place of service and dispensing the coffee using the invention has a number of advantages compare to the way coffee is served today.

At brewing centers sophisticated brewing machines can be used to achieve higher quality and better tasting coffee, which are too expensive to be used in restaurant or business offices.

Because of the centralization, the high quality coffee can be delivered to any place at lower price than it will cost to make at the service location using their own coffee maker.

These embodiments of the invention will probably cost less than an average size coffee maker.

These will also be the option of renting the beverage dispenser having selectable temperature from the coffee distributor either for a single use (party) or for a longer term use (restaurants or business offices). It will eliminate the burden and save the time of preparing the coffee. It will give the business owner the freedom to order a different quantity of coffee, i.e., different size tank, according to the need per that day. It will allow each place to have many different coffee flavors. Using the invention will allow each patron to choose the temperature of his coffee as he desires.

A schematic drawing of this embodiment of the invention to which a portable coffee tank is coupled can be seen in FIG. 9. The coffee is brewed at a brewing center, where sophisticated brewing machines and methods will be used to achieve high quality coffee. The very hot coffee coming out of the brewer will preferably be cooled down to room temperature or cooler to preserve the quality and taste of the coffee for a longer time. The cooling can be done using a brazed plates heat exchanger, in which the cooling water, whose temperature at the exit of the heat exchanger will be only few degrees lower than the hot coffee coming out of the brewer, will be returned to the coffee brewer as hot water. This will allow saving of up to 70–80 percent of the power that is needed to heat up the water in the brewer as will be explained in FIG. 12.

In the following embodiments of the machine of the invention, therefore, there is no need for cooling the coffee to $T_c$ as in the embodiments described above, eliminating the need for cooling elements in the machine. If the cooler coffee for the mixing valve is modified in temperature from the tank coffee at all, it will be heated—a more economical approach, as heating elements are less expensive than cooling systems.

The cold coffee will be stored in portable holding tanks (95) having different sizes. The portable tank (95) has a vent valve (96) on the top and a special coupling valve (97) to the dispensing system on the bottom. The freshly brewed cold coffee will be delivered to the locations of service (restaurants, business-offices, hotels, parties, and more) where the portable tank (95) will be coupled to the system of the invention (100). Using this dispensing system each patron will be able to choose the temperature of his coffee as he desires.

The coffee temperature in the portable tank (95), which is referred to as "$T_t$", is at room temperature or cooler. The exact value of $T_t$ will be determined by the requirements to preserve the quality and taste of the coffee for a long time.

In this embodiment of the invention the dispensing system has two reservoirs referred to herein as the "hot" reservoir (103), kept at regulated temperature $T_h$, and the "cold" reservoir (104), kept at regulated temperature $T_c$. The volume of these reservoirs are smaller than the portable tank, preferably one-half gallon to one gallon each.

The "hot" temperature $T_h$ will need to be greater than or equal to the highest temperature oat which it will be desired to dispense the beverage. For most coffee dispensers a temperature of 180–190° F. would be preferred The "cold" temperature $T_c$ will be less than or equal to the lowest temperature at which would be desired to dispense the beverage—about 120–130° F. is preferred, although this temperature can be higher or lower as desired.

In the preferred embodiment, the coffee temperature in the portable tank (95) will be much lower than the temperature of the "cold" reservoir (104) (i.e. $T_h > T_c >> T_t$). As a result, the coffee from the portable tank (95) will need to pass from the exit pipe (115) through a "fast heater" (101) before its enters the hot reservoir (103), so its temperature will be close to the desired hot reservoir temperature $T_h$. Also, the coffee from the portable tank (95) will need to pass from the exit pipe (115) through an additional "fast heater" (102) before its enters the cold reservoir (104), so its temperature will be close to the desired cold reservoir temperature $T_c$. The preferred internal volume of the "fast heaters" (101,102) is equal to the size of a large cup of coffee (12–16 oz.) and the coffee temperature in the "fast heaters" is regulated to be equal to $T_h$ and $T_c$, respectively. In this way, the moment a serving of coffee is dispensed, the new coffee that is entering the reservoir (103) from the fast heater (101) and reservoir (104) from the fast heater (102) will be at the right temperature. Therefore, it will not cause significant temperature fluctuation in the hot and cold coffee reservoirs. The new cold coffee that is drawn from the portable tank into the "fast heater" (101) and (102) will be heated by the fast heating elements (118,120). Assuming 1500 watt heating elements (118,120) are used in the "fast heaters", the system will be able to dispense 150 large cups of coffee per hour—five gallons of coffee.

The heating elements (119) and (121) in the hot and cold reservoir are used mainly for temperature regulation.

Vent lines (116) from the hot and cold reservoirs (103, 104) and vent lines (114) from the "fast heaters" (101,102) lead back to the top of the portable tank (95) to avoid flow problems due to back pressure as coffee fills the "fast heaters" and the reservoirs.

Output pipe (123) from the hot reservoir (103) is connected to one input of the mixer valve (105) and output pipe (124) from the cold reservoir (104) is connected to the second input of the mixer valve (105). The mixed coffee is dispensed into a cup from the mixer valve output (130) through a dispensing valve (106). The selected coffee dispensing temperature can be thus varied continuously from $T_c$ (the temperature of the cold reservoir) if the mixer valve is set to draw only from the cold reservoir, to $T_h$ (the temperature of the hot reservoir) if the mixer valve is set to draw only from the hot reservoir. At any intermediate setting, the dispensing coffee temperature will depend on the mixture.

The preferred mixer valve (105) will be constructed by coupling two linear valves using a 1:1 ratio gear and using commercial valve driving controller which uses a step-motor and microprocessor to drive one valve. Since the two valves are coupled together by a 1:1 gear, when one will be opened the second will be closed by the same amount.

The input command to the valve controller is preferably either a voltage in the range of 1 to 5 volts or a current of 4 to 20 ma. For a 1 volt (4 ma) input command the master valve (the valve that is driven by the step motor) will be closed and the slave valve will be open while for a 5 volt (20 ma) input command the master valve will be open and the slave valve will be close. At any intermediate input command the relative position of each valve is linearly proportional to the input command voltage (current).

The temperatures of the coffee in the "fast heater" (101, 102) and the reservoirs (103,104) are continuously measured using temperature sensors (125,126,127,128. The sensors are connected to the electronics interface board (109) which amplify and scales the sensors signal. The output of the interface board (109) is connected to the system main microprocessor (110). The microprocessor (110) uses the measured temperatures to regulate the coffee temperatures in the "fast heaters" (101,102), the hot (103) and the cold (104) reservoirs. The regulating output, TLL level signals, from the microprocessor are connected to the heating elements (118,119,120,121) interface board (107,108) which include fast switching transistors and relays. The relays are used to switch on/off the AC voltage to the heating elements as needed.

The temperature of the dispensed coffee is selected by using two control buttons, the "up" button (112) and the "down" button (113), and the selected temperature is displayed in the numerical display (111). By pressing once on the up button (112) the dispensed coffee temperature will increment by a chosen amount—preferably one degree—and by pressing once on the down button (113) the dispensed coffee temperature will decrement by the same amount. By pressing continuously on the up/down buttons the dispensed coffee temperature will be increased/decreased continuously—preferably at a rate of about three degrees per second—and the temperature display (111) will also change at the same rate.

The system microprocessor (110) will adjust the mixer valve (105) position to correspond to the new selected coffee temperature at the same rate of three degrees per second.

The microprocessor (110) uses the measured temperature $T_h$ (126) of the hot reservoir (103) and the measured temperature $T_c$ (128) of the cold reservoir (104) and the newly selected coffee temperature $T_p$ to calculate the new position of the master valve.

The microprocessor (110) can use the following algorithm:

If we define a parameter X as the position of the "master" valve (the valve which is driven by the step-motor) and 1-X as the position of the "slave" valve we can write the selected coffee temperature as $$T_p = XT_c + (1-X)T_h$$

From which we can find that the new position X of the master valve corresponding to $T_p$ is given by $$X = \frac{T_h - T_p}{T_h - T_c}$$

where the parameter X can change from 0 (closed valve) to 1 completely open valve).

In the above derivations the output (124) of the cold reservoir (104) is connected to the master valve input while the output (123) of the hot reservoir (103) is connected to the slave valve input.

In practice, the mixer valves are not exactly linear in the whole range from closed to open position. Therefore, in order to ensure that the dispensed coffee temperature will be whitin one degree of the selected one, we will provide fine position adjustment by feedback from the actual dispensed coffee temperature. The actual dispensed coffee temperature is measured by temperature sensor (129) which is mounted at the mixer valve output pipe (130). The fine adjustment is accomplished by modifying the mixer valve positions that correspond to the selected temperature:

$$X = \frac{T_h - T_p + T_f}{T_h - T_c}$$

Where $T_f$ is the correction from feedback. $T_f$ is obtained by periodically accumulating the error of the outlet temperature—preferably about fifteen times per second. Each time $T_f$ is incremented by the scaled difference between the actual dispensed coffee temperature $T_o$ and the selected coffee temperature $T_p$:

$$T_f = S*(T_o - T_p) + T_f, \text{ with } -T_m < T_f < T_m,$$

Where $T_m$ is a limit on the maximum magnitude of the feedback correction. From this, one can see that if $T_o$ is too high, the controller (110) will progressively increase X. i.e. increase the flow rate from the cold reservoir and decrease the flow rate from the hot reservoir until $T_o$ is correct, and the opposite if $T_o$ is too low. S is a scale factor that determines the response time of the feedback. The constants S and $T_m$ together determine the amount of temperature overshoot that will occur when dispenser flow is started, and can be adjusted to compensate for cool-off of the coffee trapped in the outlet pipe and the mixer valve (1050 between uses.

FIG. 10 shows an alternative embodiment of the invention, in which the cold reservoir (104) and the "fast heater" (102) are replaced by a direct feed line (124) from the cold portable tank (95) to the input of the mixer valve (105). This embodiment can be built as a simpler version of the embodiment of FIG. 9. As in the embodiment described in FIG. 9, the hot reservoir (103) is connected to the portable tank (95) output (115) via a fast heater (101) that heats up the incoming coffee from $T_t$ to $T_h$.

The rest of the system of this embodiment is the same as described above for the embodiment of FIG. 9.

In case where there are no adequate power outlets to operate the beverage-dispenser, such as at outdoor events or conferences at hotels where the coffee is rolled in during coffee break the preferred embodiment of the invention is shown in FIG. 11. In this embodiment, the coffee is stored at the Brewing Center in a special insulated portable tank (150) which is divided into two chambers (151, 152). The very hot coffee coming out of the brewer is stored in the larger chamber (151) while the cooled down coffee is stored in the smaller chamber (152). The coffee that is stored in the smaller chamber (152) is cooled to room temperature or higher as it comes out of the brewer using a heat exchanger as is described in FIG. 12. The special portable tank (150) has two vent valves (153, 154) at the top and two output ports (155, 156). At the place of service the portable tank (150) is coupled to the apparatus of the invention (140).

In this simplified dispenser, the coffee from the hot chamber (151) is connected directly via a pipe (159) to one input of the mixer valve (105) while the cold coffee from the smaller chamber (152) is connected directly via a pipe (160) to the second input of the mixer valve (105). The mixed coffee is dispensed into a cup from the mixer valve output pipe (130) through a dispensing valve (106). The main microprocessor (110) is using the continuously measured temperatures of the coffee in the hot chamber (151), $T_h$, by the temperature sensor (157) and the coffee in the cold chamber (152), $T_c$, by temperature sensor (158), and the selected temperature, $T_p$, to calculate and adjust the mixer valve position as was described in the embodiment of FIG. 9. The rest of the dispenser system is the same as was described in FIG. 9.

This embodiment of the system (140) will preferably be operated by batteries similar to the one used in power tools. Each dispenser will include two batteries, one active and the other as backup.

An alternative method to operate the dispenser (140) will be to use a low power battery to operate the controller electronics and select the desired coffee temperature using a manual system as was described in FIG. 5. The dispensed coffee temperature corresponding to the new position of the mixer valve (105) will be calculated by the microprocessor (110) and displayed in the numerical display (111).

In the above embodiment of the invention, even so the coffee is stored in the portable tank at high temperature, the high quality and taste of the coffee will be preserved since it will be stored in the portable tank only for relatively short time. Because in outdoor events and conferences coffee break the coffee is consumed in short time.

Figure 12:
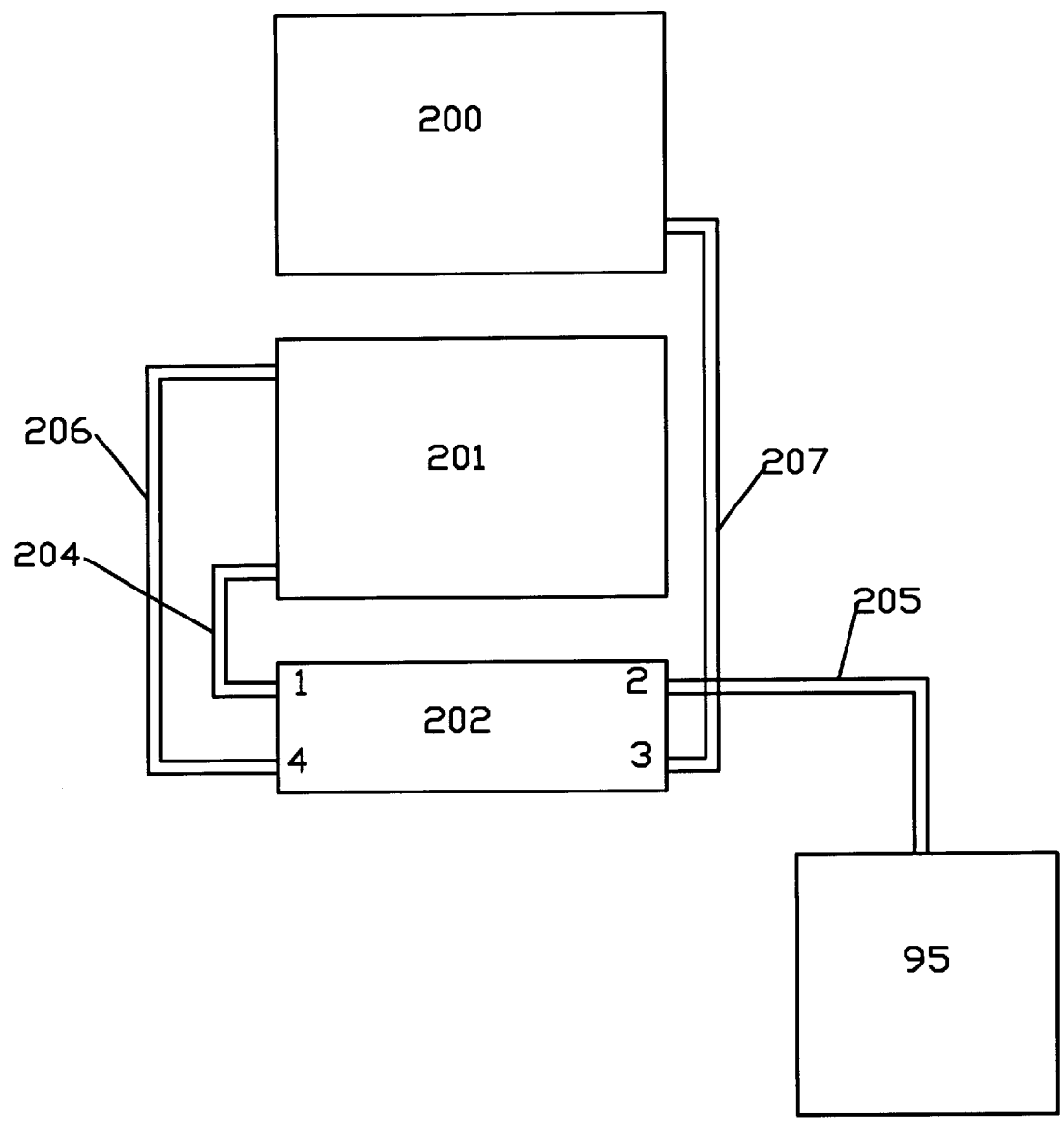
FIG. 12 shows a schematic of an apparatus for brewing and cooling the beverage at a brewing center.

At the brewing center the freshly brewed hot coffee will be cooled down before it will be stored in the portable tank (95). In FIG. 12 a cooling method is shown which will allow saving 70–80 percent of the power that is needed to heat up the water for the coffee in the brewer.

In this method, the cold water for the coffee which is stored in holding tank (200) is also used to cool the hot coffee coming out of the brewer (201) using a brazed plates Heat-Exchanger (202). The hot brewed coffee coming out from the brewer (201) is connected by pipe (204) to the Heat-Exchanger (202) hot side input port #1. The cooled down coffee exits through the hot side output port #2 which is connected via pipe (205) to the portable tank (95). The cold water from tank (200) is connected by pipe (207) to the Heat-Exchanger cold side input port #3. The heated water exits through the cold side output port #4 which is connected via pipe (206) to the water input of the coffee brewer (201). Since the temperature of the water at the exit from the Heat-Exchanger will be only few degrees cooler than the temperature of the hot coffee coming out of the brewer (210), upon entering the coffee brewer it will need to be heated only by an additional few degrees.

Accordingly, it is to be understood that the embodiment of the invention herein described are merely illustrative of the application of the principles of the invention. Reference herein to details of the illustrated embodiments is not intended to limit the scope of the claims, which themselves recite those features regarded as essential to the invention.

What is claimed is:

1. A beverage machine for dispensing hot beverages at a selected temperature in a range between a higher temperature and a lower temperature, comprising:

a) a brew inlet for accepting the beverage from a source of prepared beverage;

b) a holding tank for holding the beverage at a selected temperature at least as high as the higher temperature, having an inlet connected to the brew inlet, an outlet, and a heater for maintaining beverage at the selected temperature;

c) a cold reservoir for holding the beverage at a selected temperature no higher than the lower temperature, having an inlet for accepting beverage, an outlet, and a heater for maintaining beverage at the selected temperature;

d) a cooler for lowering the temperature of a beverage, having an input connected to the outlet of the holding tank and an output connected to the inlet of the cold reservoir, such that hot beverage from the holding tank is cooled as it passes through the cooler to the cold reservoir;

e) a mixing valve having a first input connected to the outlet of the cold reservoir, a second input connected to the outlet of the holding tank, and an output producing a mixture of fluid from the first input and second input, the proportions of fluid in the mixture from the first input and the second input being controlled in response to the position of the mixing valve control; and f) a vending valve having an input connected to the output of the mixing valve and an output for dispensing the beverage;

such that when the valve is opened, beverage is dispensed having a temperature determined by the position of the mixing valve control, mixing beverage from the holding tank and beverage from the cold reservoir.

2. The beverage machine of claim 1, further comprising a temperature display for showing the temperature of the beverage to be dispensed, comprising:

a) a first temperature sensor for measuring the temperature of the cold reservoir;

b) a second temperature sensor for measuring the temperature of the holding tank;

c) a valve position sensor coupled to the mixing valve, having an output which is proportional to the position of the mixing valve control;

d) a display for displaying a temperature;

e) a display control circuit, having a first input connected to the first sensor, a second input connected to the second sensor, a third input connected to the valve position sensor, and an output connected to the display, the display control circuit reading the temperature of the holding tank and cold reservoir through the first and second sensors, and the proportion of beverage dispensed from the reservoirs at the position of the mixing valve, and displaying on the display the temperature of the beverage which would be dispensed.

3. The beverage machine of claim 1, further comprising a dispensed beverage temperature control for selecting a dispensing temperature, comprising:

a) a first temperature sensor for measuring the temperature of the cold reservoir;

b) a second temperature sensor for measuring the temperature of the holding tank;

c) a valve position sensor coupled to the mixing valve, having an output which is proportional to the position of the mixing valve control;

d) a motor coupled to the mixing valve; and e) a temperature control circuit, having a first input connected to the first sensor, a second input connected to the second sensor, a third input connected to the valve position sensor, and an output connected to the motor, the temperature control circuit reading the temperature of the holding tank and cold reservoir through the first and second sensors, and the proportion of beverage dispensed from the reservoirs at the position of the mixing valve, and driving the motor to turn the mixing valve to dispense beverage at the selected dispensing temperature.

4. The beverage machine of claim 3, further comprising a keypad connected to the temperature control circuit, such that the dispensing temperature is entered into the control circuit through the keypad.

5. The beverage machine of claim 3, further comprising a display connected to the control circuit, the control circuit displaying the selected dispensing temperature on the display.

6. The beverage machine in claim 1, in which the cooler comprises:

a) an outer tube having a first end connected to the outlet of the holding tank and a second end connected to the inlet of the cold reservoir;

b) a heat exchanger surrounding at least part of the outer tube;

c) an inner tube having closed ends, fitted coaxially inside the outer tube, leaving an annular gap between the inner tube and the outer tube;

d) a wire wound helically around the inner tube, substantially filling the annular gap between the inner tube and the outer tube, such that beverage flowing in the first end of the outer tube is guided helically around the inner tube through the annular gap to the second end of the outer tube.

7. The beverage machine of claim 6, in which the heat exchanger comprises tubes carrying cooled fluid.

8. The beverage machine in claim 7, in which the fluid is water.

9. The beverage machine of claim 6, in which the heat exchanger comprises fins for air cooling on the outside tube, and a fan for moving air over the fins.

10. A beverage machine for dispensing hot beverages at a selected temperature in a range between a higher temperature and a lower temperature, comprising:

a) a brew inlet for accepting the beverage from a source of prepared beverage;

b) a holding tank for storing a quantity of the beverage at a selected temperature in a range between the higher temperature and the lower temperature, having an inlet connected to the brew inlet and an outlet;

c) a hot reservoir for holding the beverage at a selected temperature at least as high as the higher temperature, having an inlet, an outlet, and a heater for maintaining beverage at the selected temperature;

d) a cold reservoir for holding the beverage at a selected temperature no higher than the lower temperature, having an inlet for accepting beverage, an outlet, and a heater for maintaining beverage at the selected temperature;

e) a cooler for lowering the temperature of a beverage, having an input connected to the outlet of the holding tank and an output connected to the inlet of the cold reservoir, such that hot beverage from the holding tank is cooled as it passes through the cooler to the cold reservoir;

f) a fluid heater for raising the temperature of a beverage, having an input connected to the outlet of the holding tank and an output connected to the inlet of the hot reservoir, such that hot beverage from the holding tank is heated as it passes through the heater to the cold reservoir;

g) a mixing valve having a first input connected to the outlet of the cold reservoir, an second input connected to the outlet of the hot reservoir, and an output producing a mixture of fluid from the first input and second input, the proportions of fluid in the mixture from the first input and the second input being controlled in response to the position of the mixing valve control; and h) a vending valve having an input connected to the output of the mixing valve and an output for dispensing the beverage;

such that when the vending valve is opened, beverage is dispensed having a temperature determined by the position of the mixing valve control, mixing beverage from the hot reservoir and beverage from the cold reservoir.

11. The beverage machine of claim 10, further comprising a temperature display for showing the temperature of the beverage to be dispensed, comprising:

a) a first temperature sensor for measuring the temperature of the cold reservoir;

b) a second temperature sensor for measuring the temperature of the hot reservoir;

c) a valve position sensor coupled to the mixing valve, having an output which is proportional to the position of the mixing valve control;

d) a display for displaying a temperature;

e) a display control circuit, having a first input connected to the first sensor, a second input connected to the second sensor, a third input connected to the valve position sensor, and an output connected to the display, the display control circuit reading the temperature of the hot reservoir and cold reservoir through the first and second sensors, and the proportion of beverage dispensed from the reservoirs at the position of the mixing valve, and displaying on the display the temperature of the beverage which would be dispensed.

12. The beverage machine of claim 10, further comprising a dispensed beverage temperature control for selecting a dispensing temperature, comprising:

a) a first temperature sensor for measuring the temperature of the cold reservoir;

b) a second temperature sensor for measuring the temperature of the hot reservoir;

c) a valve position sensor coupled to the mixing valve, having an output which is proportional to the position of the mixing valve control;

d) a motor coupled to the mixing valve; and e) a temperature control circuit, having a first input connected to the first sensor, a second input connected to the second sensor, a third input connected to the valve position sensor, and an output connected to the motor, the temperature control circuit reading the temperatures of the hot reservoir and cold reservoir through the first and second sensors, and the proportion of beverage dispensed from the reservoirs at the position of the mixing valve, and driving the motor to turn the mixing valve to dispense beverage at the selected dispensing temperature.

13. The beverage machine of claim 12, further comprising a keypad connected to the temperature control circuit, such that the dispensing temperature is entered into the control circuit through the keypad.

14. The beverage machine of claim 12, further comprising a display connected to the control circuit, the control circuit displaying the selected dispensing temperature on the display.

15. The beverage machine of claim 10, in which the cooler comprises:

a) an outer tube having a first end connected to the outlet of the holding tank and a second end connected to the inlet of the cold reservoir;

b) a heat exchanger surrounding at least part of the outer tube;

c) an inner tube having closed ends, fitted coaxially inside the outer tube, leaving an annular gap between the inner tube and the outer tube;

d) a wire wound helically around the inner tube, substantially filling the annular gap between the inner tube and the outer tube, such that beverage flowing in the first end of the outer tube is guided helically around the inner tube through the annular gap to the second end of the outer tube.

16. The beverage machine of claim 15, in which the heat exchanger comprises tubes carrying cooled fluid.

17. The beverage machine of claim 16, in which the fluid is water.

18. The beverage machine of claim 15, in which the heat exchanger comprises fins for air cooling on the outside tube, and a fan for moving air over the fins.

19. The beverage machine of claim 10, in which the fluid heater comprises:

a) an outer tube having a first end connected to the outlet of the holding tank and a second end connected to the inlet of the hot reservoir;

b) an external heater surrounding at least part of the outer tube;

c) an inner tube having closed ends, fitted coaxially inside the outer tube, leaving an annular gap between the inner tube and the outer tube;

d) a wire wound helically around the inner tube, substantially filling the annular gap between the inner tube and the outer tube, such that beverage flowing in the first end of the outer tube is guided helically around the inner tube through the annular gap to the second end of the outer tube.

20. The beverage machine in claim 19, in which the external heater comprises at least one electric heater which operates continuously.

21. The beverage machine of claim 19, in which the external heater comprises at least one electric heater which operates intermittently.

22. A method of dispensing a beverage at a selected temperature between a higher temperature and a lower temperature, comprising the steps of:

a) preparing the beverage;

b) holding a first quantity of the beverage in a hot reservoir at a temperature at least as high as the higher temperature;

c) holding a second quantity of the beverage in a cold reservoir at a temperature no higher than the lower temperature.

d) setting a mixing valve connected to the hot reservoir and the cold reservoir to mix a proportion of beverage from the hot reservoir and a proportion of beverage from the cold reservoir, the proportion being chosen such that a beverage mixed in the mixing valve will be at the selected temperature;

e) dispensing the beverage at the selected temperature from the mixing valve.

23. The method of claim 22, in which the step of preparing the beverage includes the step of holding the beverage in a holding tank for dispensing.

24. The method of claim 23, in which the step of preparing the beverage is done in a conventional coffee machine.

25. A beverage machine for dispensing hot beverages at a selected temperature in a range between a higher temperature and a lower temperature, comprising:
   a) a holding tank for holding the beverage, having an outlet;
   b) a hot reservoir for holding the beverage at a selected temperature no lower than the higher temperature, having an inlet for accepting beverage coupled to the outlet of the holding tank, an outlet, and a heater for maintaining beverage at the selected temperature;
   c) a cold reservoir for holding the beverage at a selected temperature no higher than the lower temperature, having an inlet for accepting beverage coupled to the outlet of the holding tank, an outlet, and a heater for maintaining beverage at the selected temperature;
   d) a mixing valve having a first input connected to the outlet of the cold reservoir, a second input connected to the outlet of the hot reservoir, and an output producing a mixture of fluid from the first input and second input, the proportions of fluid in the mixture from the first input and the second input being controlled in response to the position of the mixing valve control; and
   f) a vending valve having an input connected to the output of the mixing valve and an output for dispensing the beverage;
   such that when the vending valve is opened, beverage is dispensed having a temperature determined by the position of the mixing valve control, mixing beverage from the hot reservoir and beverage from the cold reservoir.

26. The beverage machine of claim 25 wherein the holding tank is portable.

27. The beverage machine of claim 25, further comprising a preheater having an inlet coupled to the outlet of the holding tank and an outlet coupled to the inlet of the cold reservoir and a volume much smaller than the cold reservoir, such that the beverage from the holding tank is heated in the volume of the preheater before being introduced into the cold reservoir.

28. The beverage machine of claim 25, further comprising a preheater having an inlet coupled to the outlet of the holding tank and an outlet coupled to the inlet of the hot reservoir and a volume much smaller than the hot reservoir, such that the beverage from the holding tank is heated in the volume of the preheater before being introduced into the hot reservoir.

29. The beverage machine of claim 25, further comprising a dispensed beverage temperature control for controlling a dispensing temperature at which the beverage is dispensed, comprising:
   a) a temperature selector for inputting a dispensing temperature;
   b) a first temperature sensor for measuring the temperature of the cold reservoir;
   c) a second temperature sensor for measuring the temperature of the hot reservoir;
   d) a motor coupled to the mixing valve; and
   e) a temperature control circuit, having a first input connected to the first sensor, a second input connected to the second sensor, a third input connected to the temperature selector, and an output connected to the motor,
   the temperature control circuit reading the temperatures of the cold reservoir and the hot reservoir through the first and second sensors, and the dispensing temperature from the temperature selector, and driving the motor to turn the mixing valve to dispense beverage at the selected dispensing temperature.

30. The beverage machine of claim 29, in which the temperature selector comprises a keypad connected to the temperature control circuit, such that the dispensing temperature is entered into the control circuit through the keypad.

31. The beverage machine of claim 30, in which the temperature selector further comprises a display connected to the control circuit, the control circuit displaying the selected dispensing temperature on the display.

32. A beverage machine for dispensing hot beverages at a selected temperature in a range between a higher temperature and a lower temperature, comprising:
   a) a holding tank for holding the beverage, having an outlet;
   b) a hot reservoir for holding the beverage at a selected temperature no lower than the higher temperature, having an inlet for accepting beverage coupled to the outlet of the holding tank, an outlet, and a heater for maintaining beverage at the selected temperature;
   c) a mixing valve having a first input connected to the outlet of the hot reservoir, a second input connected to the outlet of the holding tank, and an output producing a mixture of fluid from the first input and second input, the proportions of fluid in the mixture from the first input and the second input being controlled in response to the position of the mixing valve control; and
   f) a vending valve having an input connected to the output of the mixing valve and an output for dispensing the beverage;
   such that when the vending valve is opened, beverage is dispensed having a temperature determined by the position of the mixing valve control, mixing beverage from the hot reservoir and beverage from the holding tank.

33. The beverage machine of claim 32, in which the holding tank is portable.

34. The beverage machine of claim 32, further comprising a preheater having an inlet coupled to the outlet of the holding tank and an outlet coupled to the inlet of the hot reservoir and a volume much smaller than the hot reservoir, such that the beverage from the holding tank is heated in the volume of the preheater before being introduced into the hot reservoir.

35. The beverage machine of claim 32, further comprising a dispensed beverage temperature control for controlling a dispensing temperature at which the beverage is dispensed, comprising:
   a) a temperature selector for inputting a dispensing temperature;
   b) a first temperature sensor for measuring the temperature of the holding tank;
   c) a second temperature sensor for measuring the temperature of the hot reservoir;

d) a motor coupled to the mixing valve; and e) a temperature control circuit, having a first input connected to the first sensor, a second input connected to the second sensor, a third input connected to the temperature selector, and an output connected to the motor, the temperature control circuit reading the temperatures of the hot reservoir and holding tank through the second sensor and the first sensor, and the dispensing temperature from the temperature selector, and driving the motor to turn the mixing valve to dispense beverage at the selected dispensing temperature.

36. The beverage machine of claim 35, in which the temperature selector comprises a keypad connected to the temperature control circuit, such that the dispensing temperature is entered into the control circuit through the keypad.

37. The beverage machine of claim 35, in which the temperature selector further comprises a display connected to the control circuit, the control circuit displaying the selected dispensing temperature on the display.

38. A beverage machine for dispensing hot beverages at a selected temperature in a range between a higher temperature and a lower temperature, comprising:

a) a hot chamber for holding the beverage at a selected temperature no lower than the higher temperature, having an outlet;

b) a cold chamber for holding the beverage at a selected temperature no higher than the lower temperature, having an outlet;

c) a mixing valve having a first input connected to the outlet of the cold chamber, a second input connected to the outlet of the hot chamber, and an output producing a mixture of fluid from the first input and second input, the proportions of fluid in the mixture from the first input and the second input being controlled in response to the position of the mixing valve control; and d) a vending valve having an input connected to the output of the mixing valve and an output for dispensing the beverage;

such that when the vending valve is opened, beverage is dispensed having a temperature determined by the position of the mixing valve control, mixing beverage from the hot chamber and beverage from the cold chamber.

39. The beverage machine of claim 38, in which the hot chamber and the cold chamber are part of a portable unit.

40. The beverage machine of claim 38, further comprising a dispensed beverage temperature control for controlling a dispensing temperature at which the beverage is dispensed, comprising:

a) a temperature selector for inputting a dispensing temperature;

b) a first temperature sensor for measuring the temperature of the cold chamber;

c) a second temperature sensor for measuring the temperature of the hot chamber;

d) a motor coupled to the mixing valve; and e) a temperature control circuit, having a first input connected to the first sensor, a second input connected to the second sensor, a third input connected to the temperature selector, and an output connected to the motor, the temperature control circuit reading the temperatures of the cold chamber and hot chamber through the first sensor and the second sensor, and the dispensing temperature from the temperature selector, and driving the motor to turn the mixing valve to dispense beverage at the selected dispensing temperature.

41. The beverage machine of claim 40, in which the temperature selector comprises a keypad connected to the temperature control circuit, such that the dispensing temperature is entered into the control circuit through the keypad.

42. The beverage machine of claim 40, in which the temperature selector further comprises a display connected to the control circuit, the control circuit displaying the selected dispensing temperature on the display.

43. A method of dispensing a beverage at a selected temperature between a higher temperature and a lower temperature, comprising the steps of:

a) preparing the beverage at a brewing center;

b) cooling the beverage at a brewing center;

c) transferring the beverage to the service location in a portable holding tank;

d) at the service location, coupling the portable holding tank to a beverage dispensing machine having a hot reservoir and a cold reservoir;

e) holding a first quantity of the beverage in a hot reservoir at a temperature at least as high as the higher temperature;

f) holding a second quantity of the beverage in a cold reservoir at a temperature no higher than the lower temperature;

g) setting a mixing valve connected to the hot reservoir and the cold reservoir to mix a proportion of beverage from the hot reservoir and a proportion of beverage from the cold reservoir, the proportion being chosen such that a beverage mixed in the mixing valve will be at the selected temperature;

h) dispensing the beverage at the selected temperature from the mixing valve.

44. A method of dispensing a beverage at a selected temperature between a higher temperature and a lower temperature, comprising the steps of:

a) preparing the beverage at a brewing center and transferring a portion of the beverage to a hot chamber;

b) cooling a portion of the beverage at the brewing center and transferring the portion of the beverage which was cooled to a cold chamber;

c) at a service location, coupling the hot chamber and the cold chamber to a beverage dispensing machine having a mixing valve coupled to the hot chamber and the cold chamber;

d) setting the mixing valve to mix a proportion of beverage from the hot chamber and a proportion of beverage from the cold chamber, the proportion being chosen such that a beverage mixed in the mixing valve will be at the selected temperature;

e) dispensing the beverage at the selected temperature from the mixing valve.

45. The method of claim 44 in which the hot chamber and the cold chamber are part of a portable holding tank.

\* \* \* \* \*